US012620291B2

(12) United States Patent
Baker et al.

(10) Patent No.: US 12,620,291 B2
(45) Date of Patent: May 5, 2026

(54) CHANGEABLE SET SELECTOR FOR MULTIPLE SETS AND UNDERLYING SYMBOL DISPLAYS

(71) Applicant: IGT, Las Vegas, NV (US)

(72) Inventors: Curt Baker, Reno, NV (US); Nick Hillstrom, Otis Orchards, WA (US); Lauren Hillstrom, Otis Orchards, WA (US)

(73) Assignee: IGT, Las Vegas, NV (US)

( * ) Notice: Subject to any disclaimer, the term of this patent is extended or adjusted under 35 U.S.C. 154(b) by 366 days.

(21) Appl. No.: 18/521,324

(22) Filed: Nov. 28, 2023

(65) Prior Publication Data

US 2025/0174085 A1 May 29, 2025

(51) Int. Cl.
*G07F 17/00* (2006.01)
*G07F 17/32* (2006.01)

(52) U.S. Cl.
CPC ...... *G07F 17/3267* (2013.01); *G07F 17/3211* (2013.01)

(58) Field of Classification Search
None
See application file for complete search history.

(56) References Cited

U.S. PATENT DOCUMENTS

| | | | |
|---|---|---|---|
| 5,788,573 A | 8/1998 | Baerlocher et al. | |
| 6,632,139 B1 | 10/2003 | Baerlocher | |
| 6,663,489 B2 | 12/2003 | Baerlocher | |
| 6,688,977 B1 | 2/2004 | Baerlocher et al. | |
| 6,726,563 B1 | 4/2004 | Baerlocher et al. | |
| 6,758,747 B2 | 7/2004 | Baerlocher | |
| 7,172,506 B2 | 2/2007 | Baerlocher et al. | |
| 7,198,570 B2 | 4/2007 | Rodgers et al. | |
| 7,229,350 B2 | 6/2007 | Baerlocher et al. | |
| 7,470,189 B2 | 12/2008 | Baerlocher et al. | |
| 7,513,828 B2 | 4/2009 | Nguyen et al. | |
| 7,575,515 B2 | 8/2009 | Rodgers et al. | |
| 7,597,618 B2 | 10/2009 | Webb et al. | |
| 7,614,947 B2 | 11/2009 | Baerlocher et al. | |
| 7,614,953 B2 | 11/2009 | Souza et al. | |
| 7,690,978 B2 | 4/2010 | Webb et al. | |
| 7,771,268 B2 | 8/2010 | Mayeroff | |
| 8,100,754 B2 | 1/2012 | Bigelow et al. | |
| 8,262,458 B2 | 9/2012 | Rodgers et al. | |
| 8,808,083 B1 * | 8/2014 | Caputo | G07F 17/326 463/16 |
| 9,230,397 B2 * | 1/2016 | Watkins | G07F 17/34 |
| 9,607,479 B2 | 3/2017 | Robbins et al. | |
| 10,467,855 B2 | 11/2019 | Wolf et al. | |
| 2003/0224848 A1 | 12/2003 | Baerlocher et al. | |
| 2010/0120494 A1 * | 5/2010 | DeWaal | G07F 17/3227 463/20 |
| 2010/0137056 A1 * | 6/2010 | Hoffman | G07F 17/32 463/43 |
| 2011/0118006 A1 * | 5/2011 | Acres | G07F 17/34 463/31 |
| 2014/0087833 A1 | 3/2014 | Berman | |
| 2014/0274284 A1 | 9/2014 | Leupp et al. | |
| 2014/0274293 A1 | 9/2014 | Fujisawa et al. | |

(Continued)

*Primary Examiner* — Paul A D'Agostino
(74) *Attorney, Agent, or Firm* — Neal, Gerber & Eisenberg LLP

(57) ABSTRACT

Gaming systems and methods that provide a changeable set selector for multiple aligned sets and underlying symbol displays for plays of a game.

20 Claims, 20 Drawing Sheets

(56) References Cited

U.S. PATENT DOCUMENTS

| | | | | |
|---|---|---|---|---|
| 2015/0262457 | A1 | 9/2015 | Jhanb | |
| 2016/0093162 | A1 | 3/2016 | Marston | |
| 2019/0340886 | A1* | 11/2019 | Humphrey | G07F 17/3293 |
| 2020/0152013 | A1 | 5/2020 | Wright | |
| 2020/0234541 | A1 | 7/2020 | Pierer | |
| 2021/0035412 | A1* | 2/2021 | Loader | G07F 17/3211 |
| 2021/0295656 | A1* | 9/2021 | Fong | G07F 17/3258 |
| 2022/0084353 | A1* | 3/2022 | Namaziyan | G07F 17/3209 |
| 2022/0406123 | A1 | 12/2022 | Casey | |
| 2023/0245529 | A1* | 8/2023 | Maya | G07F 17/3262 463/20 |
| 2024/0087421 | A1 | 3/2024 | Walsh et al. | |
| 2024/0112523 | A1* | 4/2024 | Yi | G07F 17/3267 |
| 2024/0203210 | A1* | 6/2024 | Soong | G07F 17/3262 |
| 2025/0174084 | A1* | 5/2025 | Baker | G07F 17/3213 |
| 2025/0308336 | A1* | 10/2025 | Peterson | G07F 17/3213 |

* cited by examiner

CHANGEABLE SET SELECTOR FOR MULTIPLE SETS AND UNDERLYING SYMBOL DISPLAYS

CROSS-REFERENCE TO RELATED APPLICATIONS

This application is related to the following commonly owned co-pending patent application: U.S. application Ser. No. 18/521,288, entitled "ALIGNED SETS ASSOCIATED WITH A SET SELECTOR AND UNDERLYING SYMBOL DISPLAYS,".

BACKGROUND

In various embodiments, the present disclosure provides a changeable set selector for multiple sets and underlying symbol displays in a gaming environment.

Gaming machines may provide one or more awards in a play of a primary game. Gaming machines may require a wager to activate a play of a primary game. The award may be based a winning symbol or winning symbol combination and on the amount of the wager.

BRIEF SUMMARY

In various embodiments, the present disclosure relates to a gaming system including a processor and a memory device that stores a plurality of instructions that, when executed by the processor, cause the processor to: cause a display, by a display device, of a plurality of symbol displays; cause a display, by the display device, of a plurality of aligned sets, each aligned set comprising a primary award indicator and a quantity of blocking elements, the quantity being at least one; and cause a display, by the display device, of a set selector, the set selector comprising, for each of the aligned sets, an aligned set indicator for that aligned set. The plurality of instructions, when executed by the processor further cause the processor to: cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set, (b) an indication of a removal of a quantity of blocking elements for the indicated aligned set, and (c) an indication of a removal of a quantity of blocking elements for the indicated aligned set, a release of the indicated aligned set, and a change to the changeable set selector comprising removing any of the aligned set indicators for the indicated aligned set from the set selector.

In various other embodiments, the present disclosure relates to a gaming system including a processor and a memory device that stores a plurality of instructions that, when executed by the processor, cause the processor to: cause a display, by the display device, of a plurality of aligned sets, each aligned set comprising a primary award indicator, a first quantity of secondary award indicators, and a second quantity of blocking elements, the first quantity being at least one, the second quantity being at least one; and cause a display, by the display device, of a set selector, the set selector comprising, for each of the aligned sets, an aligned set indicator for that aligned set. The plurality of instructions, when executed by the processor further cause the processor to: cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set and of an indication of a provision of one or more of the secondary award indicators, (b) an indication of a removal of a quantity of blocking elements for the indicated aligned set, and (c) an indication of a removal of a quantity of blocking elements for the indicated aligned set, a release of the indicated aligned set, and a change to the changeable set selector comprising removing any of the aligned set indicators for the aligned set from the set selector.

In various other embodiments, the present disclosure relates to a gaming system including a processor and a memory device that stores a plurality of instructions that, when executed by the processor, cause the processor to: cause a display, by a display device, of a plurality of aligned sets, each aligned set comprising a primary award indicator, a first quantity of blocking elements, the first quantity being at least one; cause a display, by the display device, of a second quantity secondary award indicators, the second quantity being at least one; and cause a display, by the display device, of a set selector, the set selector comprising, for each of the aligned sets, an aligned set indicator for that aligned set. The plurality of instructions, when executed by the processor further cause the processor to: cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set, (b) an indication of a removal of a quantity of blocking elements for the indicated aligned set and of an indication of a provision of one or more of the secondary award indicators, and (c) an indication of a removal of a quantity of blocking elements for the indicated aligned set, a release of the indicated aligned set, and a change to the changeable set selector comprising removing any of the aligned set indicators for the aligned set from the set selector.

Additional features are described herein and will be apparent from the following Detailed Description and the figures.

DETAILED DESCRIPTION

Figure 1A:
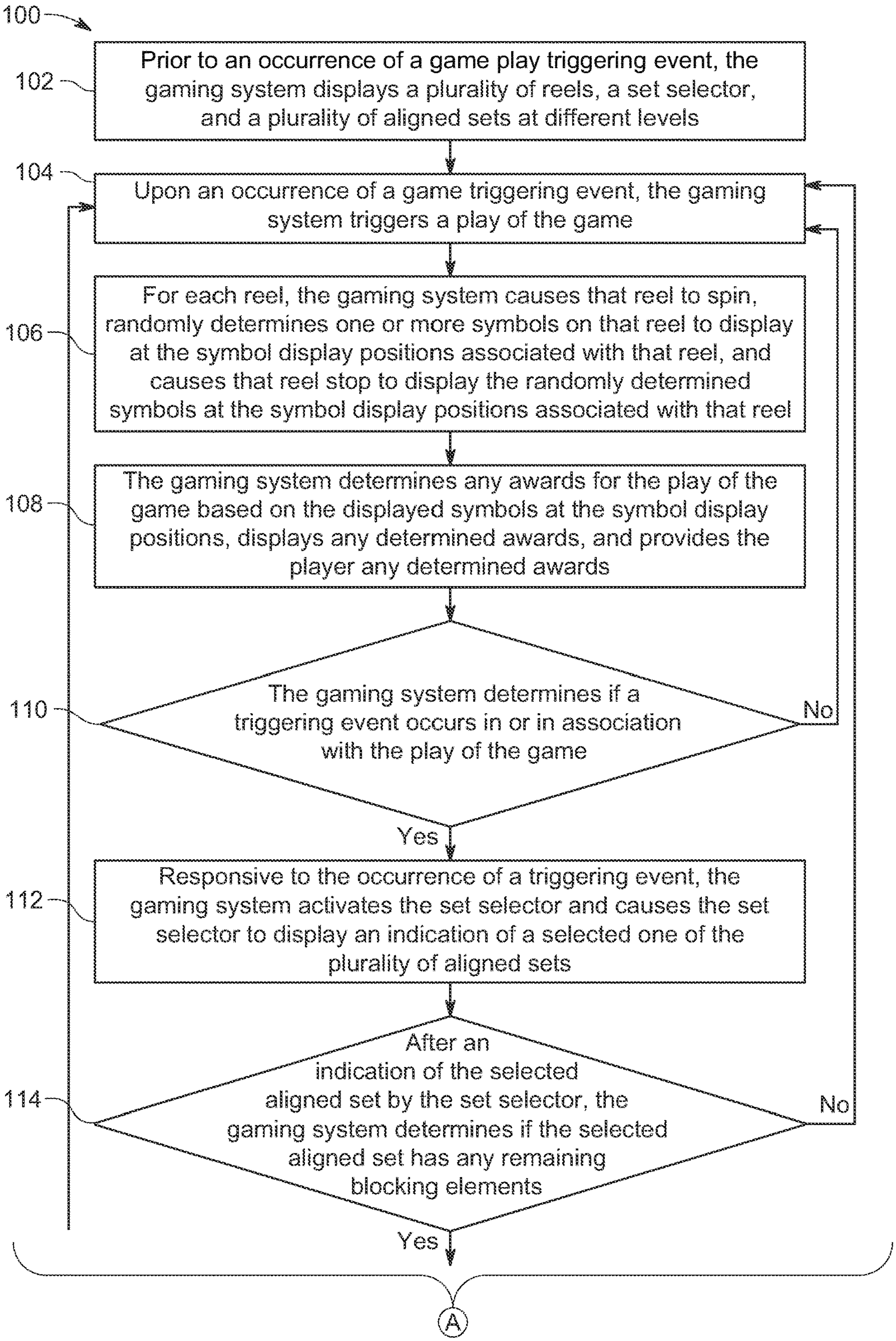
FIG. 1A is a flow chart of an example method for operating a gaming system that provides aligned sets associated with a set selector and underlying symbol displays for plays of a game in accordance with one example embodiment of the present disclosure.
Figure 1A:
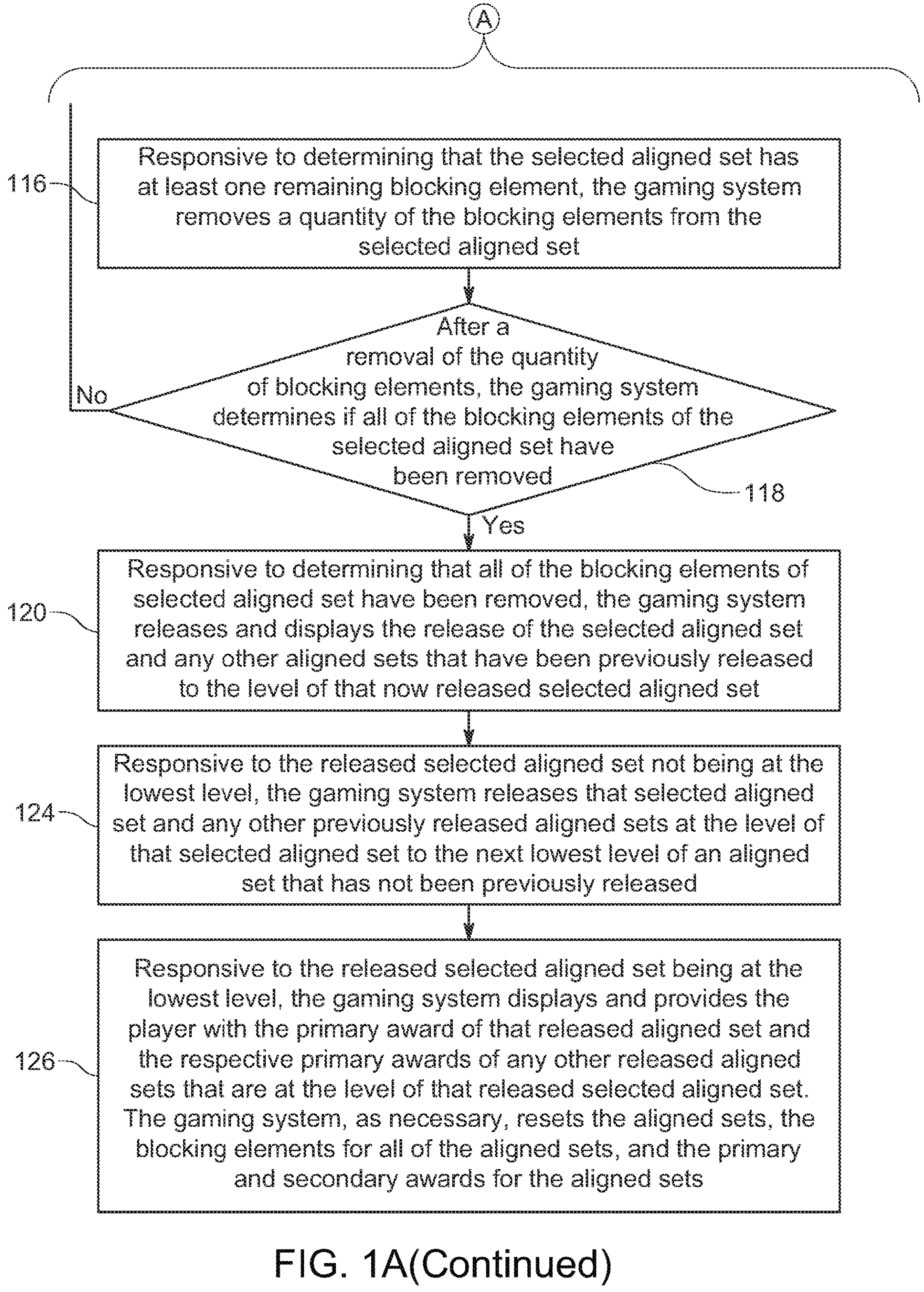

In various embodiments, the present disclosure relates to gaming systems and methods that provide a changeable set selector for multiple aligned sets and underlying symbol displays for plays of a game. In various embodiments, the present disclosure relates to gaming systems and methods that provide aligned sets associated with a set selector and underlying symbol displays for plays of a game.

In various embodiments, the game is a primary game such as a primary wagering game. In various embodiments, the game is a secondary game such as a series of free plays of the game.

In various embodiments, the gaming system includes and displays a plurality of symbol displays (such as in the form of a plurality of reels) respectively associated with the symbol display positions, where each symbol display is configured to display randomly determined symbols of that symbol display at the symbol display positions associated with that symbol display for each play of the game. In various embodiments, one or more of the symbol displays include one or more triggering symbols that function as set selector triggering events (such as described below).

In various embodiments, the gaming system includes and displays a plurality of aligned sets that are displayed adjacent to the symbol displays (such as above the symbol displays). The quantity of the aligned sets can vary in accordance with the present disclosure. In various embodiments, the quantity of aligned sets are predetermined.

In various embodiments, the quantity of aligned sets are randomly determined. In various embodiments, the quantity of aligned sets are determined in another suitable manner.

In various embodiments, each of the aligned sets includes a primary award indicator and associated primary award, one or more secondary award indicators and one or more associated secondary awards, and one or more associated blocking elements.

In various embodiments, the gaming system displays the aligned sets in a predetermined sequential order such as but not limited to: (1) a top to bottom order (such as an upright order such as a vertical order); (2) a bottom to top order (such as an upright order such as a vertical order); (3) a highest primary award amount to a lowest primary award amount order; or (4) a lowest primary award amount to a highest primary award amount order. In various such embodiments, the gaming system can initially display the aligned sets at different levels.

In various embodiments, the gaming system displays the aligned sets in a predetermined group such as but not limited to: (1) a side-to-side order such as a horizontal order; and/or (2) one or more other suitable orders. In various such embodiments, the gaming system can display the aligned sets at a same level.

In various embodiments, for each of the plurality of aligned sets, the gaming system includes and displays a primary award indicator and each of the primary award indicator indicates a primary award amount of that aligned set.

In various embodiments, for each of the plurality of aligned sets, the gaming system includes and displays one or more secondary award indicators, and each of the secondary award indicators indicates a secondary award amount of that aligned set. In various embodiments, the secondary award indicators of an aligned set are associated with the blocking elements of that aligned sets, such that one or more of the blocking elements are associated with one or more secondary award indicators and associated secondary awards.

In various embodiments, the quantity of secondary award indicators (and associated secondary awards) is static for each of one or more of the aligned sets. In various embodiments, the quantity of secondary award indicators (and associated secondary awards) is variable for each of one or more of the aligned sets. In such embodiments where the quantity of secondary award indicators are variable, the gaming system can add one or more additional secondary award indicators (and associated secondary awards) to be part of one or more of the aligned sets. In other words, in certain embodiments, the gaming system can repopulate one or more the secondary award indicators (and associated secondary awards) of one or more of the of the aligned sets.

In various embodiments, the secondary award indicators (and associated secondary awards) are associated with all of the aligned sets instead of respectively with one of the aligned sets.

In various embodiments, the secondary award indicators (and associated secondary awards) are individually associated with certain of the blocking elements instead of respectively with one of the aligned sets.

As further explained below, the secondary awards indicators and the associated secondary awards can be provided in various different manners in accordance with the present disclosure. For example, in various embodiments, the gaming system indicates one or more secondary award indicators and provides one or more associated secondary awards with: (1) the indication of a non-released aligned set by the set selector; (2) the indication of a released aligned set by the set selector; (3) the removal of one or more blocking elements; (4) the non-removal one or more blocking elements; and/or (5) the release of an aligned set. It should thus be appreciated that the present disclosure contemplates various different uses of the secondary award indicators and associated secondary awards.

In various embodiments, for each aligned set, the gaming system includes and displays one or more blocking elements of that aligned set. In various other embodiments, the gaming system includes and displays one or more blocking elements associated with a plurality such as all of the aligned sets. In various embodiments, the gaming system displays the blocking elements in a manner that enables the player to count the quantity of total blocking elements and/or in a manner that enables the player to count the quantity of blocking elements of each of the aligned sets. In various embodiments, as the gaming system removes the blocking elements, the gaming system displays the removed and/or remaining blocking elements in a manner that enables the player to count the quantity of total remaining blocking elements and/or in a manner that enables the player to count the quantity of remaining blocking elements of each of the aligned sets.

In various embodiments, the one or more blocking elements of or associated with one or more or each of the aligned sets are actual persistence elements such as further described below.

In various embodiments, the one or more blocking elements of or associated with one or more or each of the aligned sets are perceived persistence elements such as further described below.

In various embodiments, the gaming system includes and displays a set selector that is displayed adjacent to the symbol displays and adjacent to the aligned sets (such as above the symbol displays and below the aligned sets).

The set selector includes a plurality of sections and a plurality of aligned set indicators on those sections. The aligned set indicators can be any suitable indicators. The set selector includes, for each of the aligned sets, one or more aligned set indicators. In various embodiments, responsive to each occurrence of a set selector triggering event associated with the symbol displays (such as the occurrence of one of the triggering symbols on the symbol displays at one of the symbol display positions associated with the symbol displays), the gaming system determines (such as randomly) and causes the set selector to display an indication of one of the aligned set indicators of the set selector and thus an indication of a selection of one of the aligned sets.

In various embodiments, the set selector is changeable. In various embodiments, the set selector is changeable based on certain blocking elements that have been removed. In various embodiments, the set selector is changeable based on one or more of the aligned sets that have been released (such as discussed below). In various embodiments, the gaming system can change the set selector to exclude an aligned set after all the blocking elements for that aligned set have been removed. In various embodiments, the gaming system can change the set selector to exclude an aligned set after that aligned set has been released. In various embodiments, the gaming system can change the set selector to include an indication of one of the non-released aligned sets. In various embodiments, the gaming system can change the set selector to include an indication of a plurality but not all of the non-released aligned sets. In various embodiments, the gaming system can change the set selector to include an indication of all of the non-released aligned sets.

In various embodiments, the gaming system can change one of the sections of the set selector from indicating an aligned set to indicating a set selector award (such as credit values or another secondary game or award opportunity). Thus, after an aligned set is released, the set selector can provide an alternative benefit for that section instead of indicating an aligned set that has already been released.

In various other embodiments, the gaming system can change one of the sections of the set selector from indicating an aligned set that has already been released to indicating an accumulation of indications of that aligned set for use by the gaming system after the gaming system resets the blocking elements for all of the aligned sets (such as after one or more of the primary awards of the aligned sets have been released and provided to the player).

In various embodiments where the blocking elements are perceived persistence elements, responsive to each occurrence of an indication of a selection of one of the aligned sets by the set selector (via one of the aligned set indicators), the gaming system causes a display of an indication of one of: (1) an indication of no removal of any blocking element for the indicated aligned set (because the selection of the aligned set did not result in a removal of the blocking element); (2) an indication of a removal of one or more blocking elements for the indicated aligned set; (3) an indication of a removal of one or more blocking elements for the indicated aligned set and an indication of one or more secondary award indicators (and associated secondary awards) associated with the aligned set; (4) an indication of a removal of one or more blocking elements for the indicated aligned set and a release of that indicated aligned set; (5) an indication of a removal of one or more blocking elements for the indicated aligned set and a release of that indicated aligned set and any previously released aligned set that is also associated with the indicated aligned set (i.e., at the same level as the indicated aligned set); and (6) an indication of a removal of one or more blocking elements for the indicated aligned set, a release of the indicated aligned set and any previously released aligned set that is also associated with the indicated aligned set, and a provision of the primary award associated with the indicated aligned set and the primary award associated with each previously released aligned set that is also associated with the indicated aligned set. In various embodiments where the blocking elements are perceived persistence elements, the occurrence of an indication of a selection of one of the aligned sets by the set selector may or may not results in a removal of one or more of the blocking elements for that indicated aligned set.

In various embodiments where the blocking elements are perceived persistence elements, and the occurrence of an indication of a selection of one of the aligned sets by the set selector does not results in a removal of one of the blocking elements for that aligned set, the gaming system can provide one or more of the secondary awards associated with that indicated aligned set in place of the removal of one of the blocking elements of that aligned set.

In various embodiments where the blocking elements are perceived persistence elements, and the occurrence of an indication of a selection of one of the aligned sets by the set selector does not results in a removal of one of the blocking elements for that aligned set, the gaming system does not provide any of the secondary awards associated with that indicated aligned set in place of the removal of one of the blocking elements of that aligned set.

In various embodiments where the blocking elements are perceived persistence elements, and the occurrence of an indication of a selection of one of the aligned sets results in a removal of one or more of the blocking elements for that indicated aligned set, the gaming system does not provide any of the secondary awards associated with that indicated aligned set in addition to the removal of one of the blocking elements of that aligned set.

In various embodiments where the blocking elements are perceived persistence elements, and the occurrence of an indication of a selection of one of the aligned sets results in a removal of one or more of the blocking elements for that indicated aligned set, the gaming system can also provide one or more of the secondary awards associated with that indicated aligned set in addition to the removal of one of the blocking elements of that indicated aligned set.

In various embodiments where the blocking elements are actual persistence elements, responsive to each occurrence of an indication of a selection of one of the aligned sets by the set selector (via one of the aligned set indicators of the set selector), the gaming system causes a display of an indication of one of: (1) an indication of a removal of one or more blocking elements for the indicated aligned set; (2) an indication of a removal of one or more blocking elements for the indicated aligned set and an indication of a secondary award indicator and associated secondary award associated with the indicated aligned set; (3) an indication of a removal of one or more blocking elements for the indicated aligned set and a release of the indicated aligned set; (4) an indication of a removal of one or more blocking elements for the indicated aligned set and a release of the aligned set and any previously released aligned set that is also associated with the indicated aligned set; or (5) an indication of a removal of one or more blocking elements for the indicated aligned set, a release of the indicated aligned set and any previously released aligned set that is also associated with the indicated aligned set, and a provision of the primary award associated with the indicated aligned set and the primary award associated with each previously released aligned set that is also associated with the indicated aligned set. In various embodiments where the blocking elements are actual persistence elements, the occurrence of an indication of a selection of one of the aligned sets always results in a removal of one or more of the blocking elements of that aligned set.

In various embodiments where the blocking elements are actual persistence elements, and the occurrence of an indication of a selection of one of the aligned sets results in a removal of one or more of the blocking elements for that indicated aligned set, the gaming system can also provide one or more of the secondary awards associated with that indicated aligned set in addition to the removal of one or more of the blocking elements of that indicated aligned set.

In various embodiments where the blocking elements are actual persistence elements, and the occurrence of an indication of a selection of one of the aligned sets results in a removal of one or more of the blocking elements for that indicated aligned set, the gaming system does not provide one of the secondary awards associated with that indicated aligned set in addition to the removal of one or more of the blocking elements of that indicated aligned set.

In various embodiments, the gaming system can provide the secondary awards when an aligned set is released but not won by a player because the blocking elements of one or more other ones of the aligned sets prevent that released aligned set being fully released and provided to the player. Thus, in such embodiments, the secondary awards can be employed for alternative purposes to the purposes described above. In various other embodiments, the secondary awards can be employed for both purposes.

In various embodiments, responsive to each occurrence of an indication of one of the aligned sets by the set selector (via one of the aligned set indicators), the gaming system thus determines and displays one of these respective different indications based on a determination of whether to remove any of the blocking elements of that aligned set, the status of the blocking elements for each aligned set, and the status of the aligned sets due to any previous plays of the game that occurred after a reset condition.

In various embodiments, the occurrence of an indication of one of the aligned sets can cause the gaming system display one of: (1) a removal of one or more blocking elements associated with one of the aligned sets; (2) a removal of one or more blocking elements associated with one of the aligned sets and an indication of one or more secondary awards associated with that aligned set being won; (3) no removal of any blocking element associated with one of the aligned sets; or (4) no removal of any blocking elements associated with one of the aligned sets and an indication of one or more secondary awards associated with that aligned set being won.

In various embodiments, the occurrence of an indication of one of the aligned sets can cause the gaming system display one of: (a) an indication of a release of an aligned set and a primary award associated with that aligned set to be provided; (b) an indication of a release of an aligned set and primary awards respectively associated with that aligned set and one or more other aligned sets associated with that aligned set to be provided; or (c) an indication of a release of an aligned set into association with another one of the aligned sets.

Such a configuration of aligned sets associated with the symbol displays and the set selector results in multiple independent additional different award opportunities from the displayed symbols on the symbol display from game play to game play.

As indicated above, in various embodiments, the displayed blocking elements are actual persistence elements and actually indicate that the aligned set is closer or further away from being unblocked and released (and thus won, winnable, or closer to being won). In these various embodiments, the quantity of blocking elements remaining or blocking elements removed actually indicate how close to being released the aligned set is. In various such embodiments, the aligned set is guaranteed to be released after all of the blocking elements for that aligned set are removed.

As indicated above, in various embodiments, the displayed blocking elements are perceived persistence elements and do not actually indicate that the aligned set is closer or further away from being unblocked and thus released. In these various embodiments, the quantity of blocking elements remaining or blocking elements removed do not actually indicate how close to being released the aligned set is. In various such embodiments, each time an aligned set is selected, the gaming system can randomly determine to remove zero, one, a plurality, or all of the blocking elements for that aligned set. In various such embodiments, the blocking elements for an aligned set are not guaranteed to be removed regardless of the quantity of selections of the aligned set that occur.

In various embodiments, the gaming system does not display or otherwise indicate whether such displayed blocking elements are actual indications (i.e., for actual persistence blocking elements) or apparent indications (i.e., for perceived persistence blocking elements). In other words, in various embodiments, the gaming system does not display or otherwise indicate whether such blocking elements are actual persistence blocking elements or perceived persistence blocking elements. Thus, in various embodiments, a player may not know whether one or more or each of the blocking elements are actual persistence blocking elements or perceived persistence blocking elements.

In various embodiments, the gaming system displays or otherwise indicates whether such displayed blocking elements are actual indications (i.e., for actual persistence blocking elements) or apparent indications (i.e., for perceived persistence blocking elements). In other words, in various embodiments, the gaming system displays or otherwise indicates whether such blocking elements are actual persistence blocking elements or perceived persistence blocking elements.

While various embodiments described herein are directed to plays of a primary game, such as a primary wagering game, it should be appreciated that such embodiments may additionally or alternatively be employed in association with plays of a secondary game, such as free game plays.

While various embodiments described herein are directed to symbol displays that are reels, it should be appreciated that such embodiments can additionally or alternatively be employed in association with keno number displays, bingo number display, card displays, or other symbol displays.

While various embodiments described herein are directed to a set selector that is a wheel, it should be appreciated that the set selector can be another suitable display device.

While various embodiments described herein are directed to the gaming system in the form of an electronic gaming machine ("EGM") such as a slot machine, the EGM can be in other forms (with different symbol displays such as a video poker machine, a video lottery terminal, a terminal associated with an electronic table game, a terminal associated with a live table game, a video keno machine, a video bingo machine and/or a sports betting terminal (that offers sports betting opportunities and, in certain instances, wagering games)). It should also be appreciated that such embodiments may additionally or alternatively be employed in association with the gaming system with symbol displays displayed by a personal gaming device, such as desktop computers, laptop computers, tablet computers or computing devices, personal digital assistants, mobile phones, and other mobile computing devices that offer plays of games such as wagering games (and in certain instances, sports betting opportunities).

While the player's credit balance, the player's wager, and any awards are displayed as an amount of monetary credits or currency, in certain of the embodiments, one or more of such player's credit balance, such player's wager, and any awards provided to such a player may be for non-monetary credits, promotional credits, and/or player tracking points or credits.

FIG. 1A is a flowchart of an example method 100 of operating the gaming system one example embodiment of the present disclosure. In various embodiments, the method is represented by a set of instructions stored in one or more memories and executed by one or more processors. Although the method is described with reference to the flowchart shown in FIG. 1A, many other processes of performing the acts associated with this illustrated method can be employed. For example, the order of certain of the illustrated blocks or diamonds may be changed, certain of the illustrated blocks or diamonds may be optional, or certain of the illustrated blocks or diamonds may not be employed.

Prior to an occurrence of a game play triggering event, the gaming system displays a plurality of reels, a set selector, and a plurality of aligned sets at different levels, as indicated in by block 102.

Upon an occurrence of a game triggering event, the gaming system triggers a play of the game, as indicated by block 104. In certain embodiments, the game is a primary game such as a primary wagering game wherein the game triggering event includes the placement of a wager on the play of the primary game. In other embodiments, the game includes a secondary game, such as a free spin game, wherein the game triggering event occurs based on a displayed event associated with a play of a primary game. In other embodiments wherein the game includes a secondary game, such as a free spin game, the game triggering event occurs based on an event independent of any displayed event associated with the play of the primary game.

For each reel, the gaming system causes that reel to spin, randomly determines one or more symbols on that reel to display at the symbol display positions associated with that reel, and causes that reel stop to display the randomly determined symbols at the symbol display positions associated with that reel, as indicated by block 106.

The gaming system determines any awards for the play of the game based on the displayed symbols at the symbol display positions, displays any determined awards, and provides the player any determined awards, as indicated in block 108. These award determinations and awards are based on the underlying game functions and features and the symbols displayed by the reels at the symbol display positions. These awards can thus be called symbol evaluation awards. For example, in certain embodiments, the gaming system determines any symbol evaluation awards based on a ways to win symbol evaluation such as a 243 ways to win symbol evaluation. In other example embodiments, the gaming system determines any symbol evaluation awards based on any winning symbols of winning symbol combinations that are displayed on or along any active paylines and/or in a scatter configuration.

The gaming system determines if a triggering event occurs in or in association with the play of the game, as indicated by diamond 110. In various embodiments, a triggering event occurs when one or more triggering symbols are randomly determined and displayed on one of the reels at one of the symbol display positions associated with that reel. The triggering event can be an occurrence of any suitable triggering symbols or other suitable event.

Responsive to the triggering event not occurring, the gaming system returns to block 104.

Responsive to the occurrence of a triggering event, the gaming system activates the set selector and causes the set selector to display an indication of a selected one of the plurality of aligned sets, as indicated by block 112. The gaming system can determine the selected aligned set in any suitable manner such as but not limited to via a random determination. The set selector can indicate the selected aligned set indicator in any suitable manner.

After an indication of the selected aligned set by the set selector, the gaming system determines if the selected aligned set has any remaining blocking elements, as indicated by diamond 114.

Responsive to determining that the aligned set has no remaining blocking elements, the gaming system takes no action, and returns to block 104. In this example embodiment, the set selector does not change and can thus indicate an aligned set that has been previously released. In such case, in certain embodiments, the gaming system can provide one or more of the secondary awards to the player associated with that previously released aligned set that is indicated by the set selector.

In various other embodiments, if an aligned set has no remaining blocking elements, the gaming system can be configured to take one or more of the following example alternative actions: (1) remove a quantity of blocking elements of another one of the aligned sets that the selected aligned set is associated with after being previously released (because it has no blocking elements); (2) provide one or more of the secondary awards of the selected aligned set; or (3) select another one of the aligned sets using the set selector.

As mentioned above, in alternative embodiments, if all of the blocking elements of an aligned set are removed and thus that aligned set is released, the gaming system can change the set selector to remove each of the aligned set indicators corresponding to that aligned set from the set selector. In such case, the set selector will not further indicate an aligned set with no remaining blocking elements (until the set selector is reset). In such case, the gaming system can also suitably change the set selector to include other features such as mentioned above.

Responsive to determining that the selected aligned set has at least one remaining blocking element, the gaming system removes a quantity of the blocking elements from the selected aligned set, as indicated by block 116. The gaming system can determine the quantity of blocking elements to remove in any suitable manner (such as on a predetermined basis or on a random basis).

In various embodiments, the gaming system can additionally display and provide one or more of the secondary awards associated with the secondary award indicators for that selected aligned set.

After a removal of the quantity of blocking elements, the gaming system determines if all of the blocking elements of the selected aligned set have been removed, as indicated by diamond 118.

Responsive to determining that not all of the blocking elements of the selected aligned set have not been removed, the gaming system returns to block 104.

Responsive to determining that all of the blocking elements of selected aligned set have been removed, the gaming system releases and displays the release of the selected aligned set and any other aligned sets that have been previously released to the level of that now released selected aligned set, as indicated by block 120.

Responsive to the released selected aligned set not being at the lowest level, the gaming system releases that selected aligned set and any other previously released aligned sets at the level of that selected aligned set to the next lowest level of an aligned set that has not been previously released, as indicated by block 124. In other words, responsive to the selected aligned set being released, if there are any other aligned sets with remaining blocking elements lower than that released selected aligned set, the gaming system releases that selected aligned set to be at the level of the lower aligned set with the remaining blocking element(s).

Responsive to the released selected aligned set being at the lowest level, the gaming system displays and provides the player with the primary award of that released aligned set and the respective primary awards of any other released aligned sets that are at the level of that released selected aligned set, as indicated by block 126. The gaming system, as necessary, resets the aligned sets, the blocking elements for all of the aligned sets, and the primary and secondary awards for the aligned sets, as indicated by block 126.

Figure 1B:
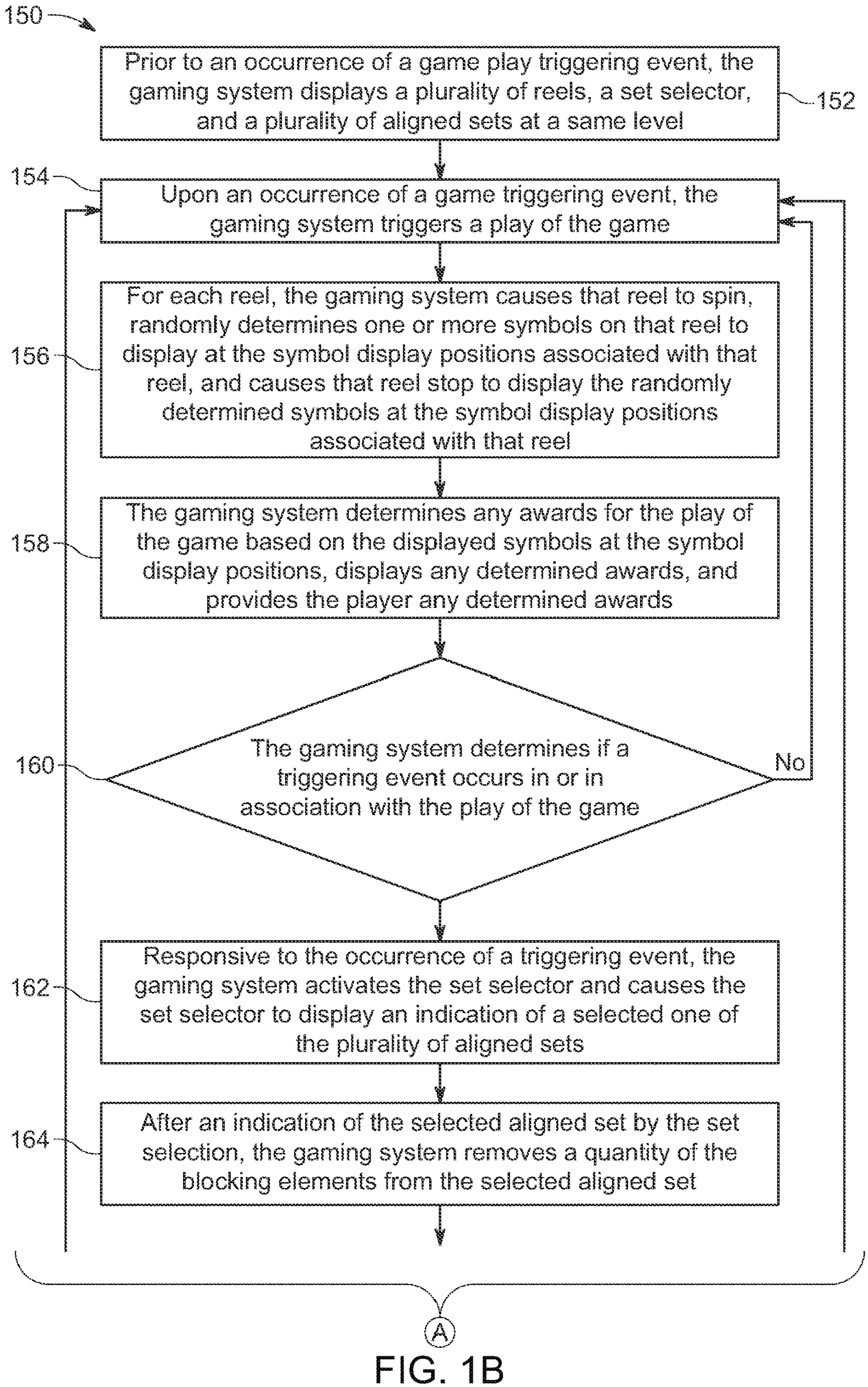
FIG. 1B is a flow chart of an example method for operating a gaming system that provides a changeable set selector for multiple sets and underlying symbol displays for plays of a game in accordance with one example embodiment of the present disclosure.
Figure 1B:
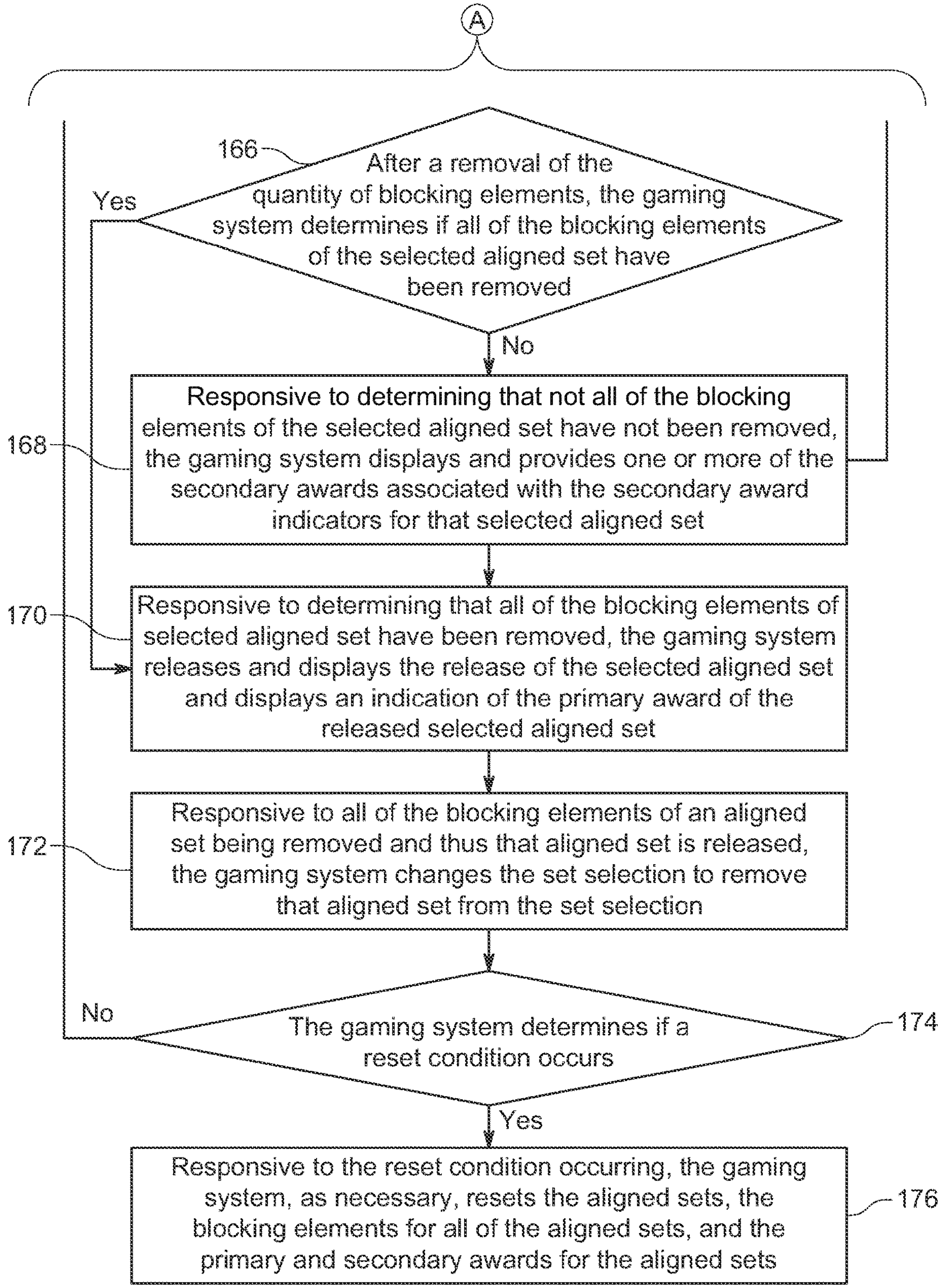

FIG. 1B is a flowchart of an example method 150 of operating the gaming system another example embodiment of the present disclosure. In various embodiments, the method is represented by a set of instructions stored in one or more memories and executed by one or more processors. Although the method is described with reference to the flowchart shown in FIG. 1B, many other processes of performing the acts associated with this illustrated method can be employed. For example, the order of certain of the illustrated blocks or diamonds may be changed, certain of the illustrated blocks or diamonds may be optional, or certain of the illustrated blocks or diamonds may not be employed.

Prior to an occurrence of a game play triggering event, the gaming system displays a plurality of reels, a set selector, and a plurality of aligned sets at a same level, as indicated in by block 152.

Upon an occurrence of a game triggering event, the gaming system triggers a play of the game, as indicated by block 154.

For each reel, the gaming system causes that reel to spin, randomly determines one or more symbols on that reel to display at the symbol display positions associated with that reel, and causes that reel stop to display the randomly determined symbols at the symbol display positions associated with that reel, as indicated by block 156.

The gaming system determines any awards for the play of the game based on the displayed symbols at the symbol display positions, displays any determined awards, and provides the player any determined awards, as indicated in block 158.

The gaming system determines if a triggering event occurs in or in association with the play of the game, as indicated by diamond 160.

Responsive to the triggering event not occurring, the gaming system returns to block 154.

Responsive to the occurrence of a triggering event, the gaming system activates the set selector and causes the set selector to display an indication of a selected one of the plurality of aligned sets, as indicated by block 162.

After an indication of the selected aligned set by the set selector, the gaming system removes a quantity of the blocking elements from the selected aligned set, as indicated by block 164. The gaming system can determine the quantity of blocking elements to remove in any suitable manner (such as on a predetermined basis or on a random basis).

After a removal of the quantity of blocking elements, the gaming system determines if all of the blocking elements of the selected aligned set have been removed, as indicated by diamond 166.

Responsive to determining that not all of the blocking elements of the selected aligned set have not been removed, the gaming system displays and provide one or more of the secondary awards associated with the secondary award indicators for that selected aligned set, as indicated by block 168. The gaming system then returns to block 154.

Responsive to determining that all of the blocking elements of selected aligned set have been removed, the gaming system releases and displays the release of the selected aligned set and displays an indication of the primary award of the released selected aligned set, as indicated by block 170.

Responsive to all of the blocking elements of an aligned set being removed and thus that aligned set is released, the gaming system changes the set selector to remove that aligned set from the set selector, as indicated by block 172. In such case, the set selector will not further indicate an aligned set indicator for that aligned set with no remaining blocking elements (until the set selector is reset).

The gaming system determines if a reset condition occurs, as indicated by diamond 174.

Responsive to the reset condition not occurring, the gaming system returns to block 154.

Responsive to the reset condition occurring, the gaming system, as necessary, resets the aligned sets, the blocking elements for all of the aligned sets, and the primary and secondary awards for the aligned sets, as indicated by block 176.

FIGS. 2A, 2B, 2C, 2D, 2E, 2F, 2G, and 2H illustrate screen shots of parts of a plurality of example plays of a primary wagering game of one example embodiment of the present disclosure on a gaming system such as an EGM.

The EGM displays via a display device 200 (such as a display device described below), a plurality of adjacently arranged video reels 210, 220, 230, 240, and 250 configured to display a plurality of symbols (on those video reels) at a plurality of symbol display positions (not labeled) respectively associated with the plurality of reels 210, 220, 230, 240, and 250.

The EGM also displays via the display device 200 a plurality of different aligned sets including: (1) a first aligned set 400 associated with a primary award amount 402 (indicated by the MINI label), a plurality of secondary award amounts 404 (not individually labeled), and a plurality of blocking elements 410 (not individually labeled); (2) a second aligned set 420 associated with a primary award amount 422 (indicated by the MINOR label), a plurality of secondary award amounts 424 (not individually labeled), and a plurality of blocking elements 430 (not individually labeled); (3) a third aligned set 440 associated with a primary award amount 442 (indicated by the MAJOR label), a plurality of secondary award amounts 444 (not individually labeled), and a plurality of blocking elements 450 (not individually labeled); and (4) a fourth aligned set 460 associated with a primary award amount 462 (indicated by the MEGA label), a plurality of secondary award amounts 464 (not individually labeled), and a plurality of blocking elements 470 (not individually labeled). The quantity of aligned set, blocking elements for each aligned set, and secondary award amount associated with each aligned set can vary in accordance with the present disclosure.

In this example embodiment, the blocking elements for each of the aligned sets prevent that aligned set from being released. For each aligned set, when all of the blocking elements for that aligned set are removed, that aligned set is released. If the lowermost aligned set 400 is released, the EGM provides the primary award amount 410 of that aligned set 400 to the player. If any of the other aligned sets 420, 440, and 460, have been released to be at the level of the lowermost aligned set 400 when the lowermost aligned set 400 is released, the EGM also provides the primary award amounts associated with those aligned sets to the player.

Thus, in this example embodiment, when the lowermost aligned set 400 is released, (1) if only the aligned set 420 has been previously released, the EGM will only provide the primary awards associated with the aligned sets 400 and 420; (2) if only the aligned sets 420 and 440 have been previously released, the EGM will only provide the primary awards associated with the aligned sets 400, 420, and 440; (3) if the aligned sets 420, 440, and 460 have been previously released, the EGM will provide the primary awards associated with the aligned sets 400, 420, 440, and 460. Thus, if the aligned set 460 has been released but the aligned sets 420 and 440 have not been previously released, the EGM will not provide the primary awards associated with the aligned set 460. Likewise, if the aligned set 440 has been released but the aligned sets 420 has not been previously released, the EGM will not provide the primary award associated with the aligned set 440. Thus, if one or more of the aligned sets 420, 440, and 460 have not been released to be at the level of the lowermost aligned set 400 when the lowermost aligned set 400 is released, the EGM does not provide any of the primary award amounts associated with those aligned sets to the player, and resets all of the blocking elements for all of the aligned sets for the next play of the game in the example.

The EGM displays via the display device 200 a set selector 300 between the reels 210, 220, 230, 240, and 250 and the aligned sets 400, 420, 440, and 460. In this example embodiment, the set selector 300 includes a wheel 302 and a pointer 305. The wheel 302 includes a plurality of different sections (such as sections 310, 330, 350, and 370) that are respectively associated with and indicate the aligned sets 400, 420, 440, and 460. Each section of the wheel 302 is this example embodiment is associated with a separate aligned set indicator (such as the respective illustrated different cross-hatchings for the aligned sets and section of the wheel 302). The aligned set indicators can be any suitable indicators. In other embodiments, one or more of the sections of the set selector can be associated with multiple aligned set indicators. The pointer 305 is configured to move, stop, and then indicate one of the sections of the wheel 302 (and the associated aligned set indicator of that section) after a set selector trigger occurs in the play of the game.

Although not shown, the EGM can also cause the display device 200 to display various other information such as but not limited to: (1) a credit meter that displays the player's credit balance; (2) a wager display that displays any wagers placed on any plays of the primary wagering game; (3) a win display that displays any awards won for each play of the primary wagering game (and any plays of secondary games); and (4) a message display configured to display messages before, during, or after each play of each game. The EGM can indicate the player's credit balance, the player's wager, and any awards available to be won or provided to the player in the form of amounts of credits. It should be appreciated that such indications can alternatively or additionally be made in the form of amounts of currency, points, or the like.

Figure 2A:
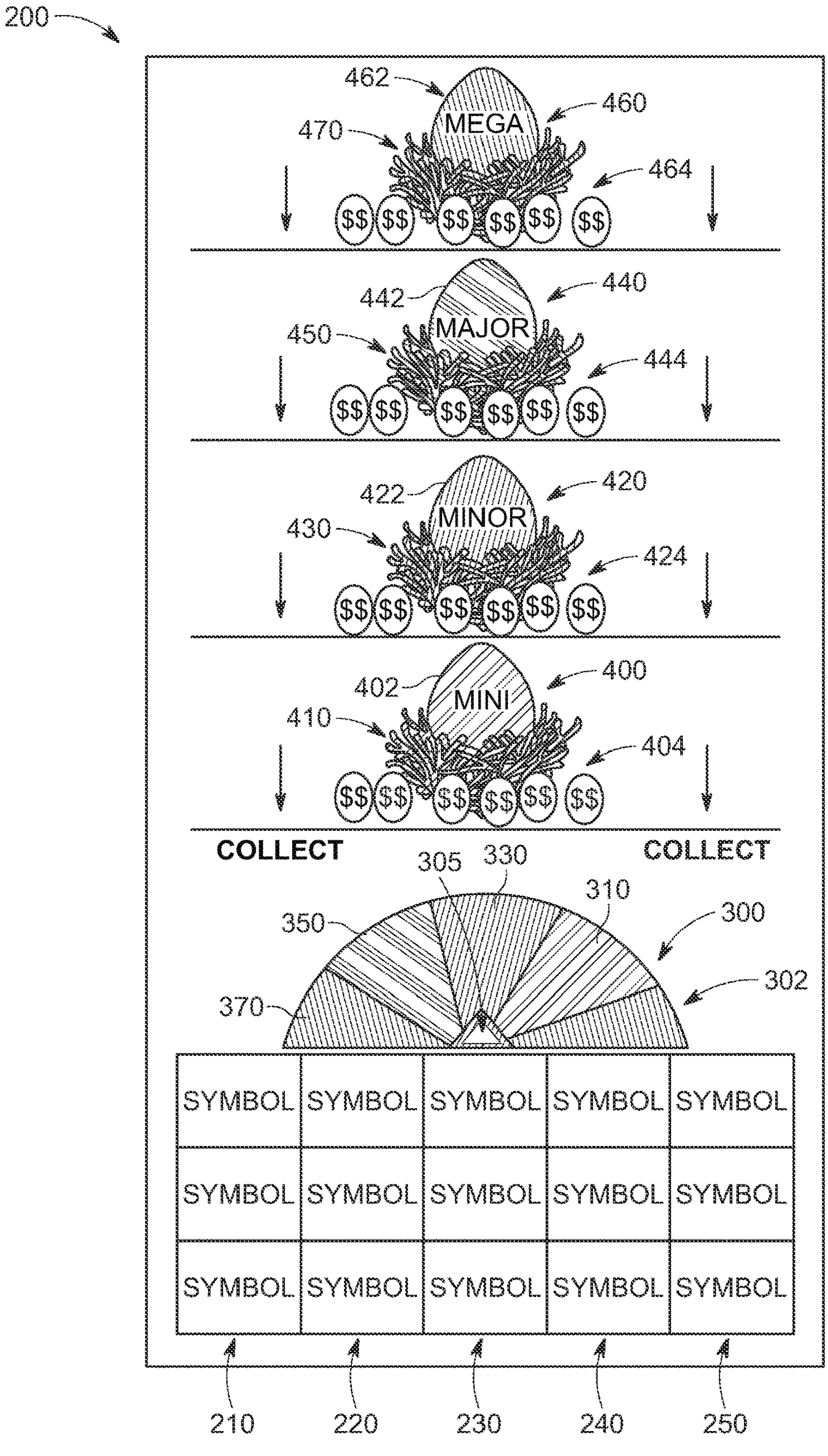
FIGS. 2A, 2B, 2C, 2D, 2E, 2F, 2G, and 2H and are front views of a display device displaying portions of multiple plays of a primary wagering game including aligned sets associated with a set selector and underlying symbol displays in accordance with one example embodiment of the present disclosure.

For the first example game play partly shown in FIG. 2A, the EGM has: (1) received a monetary amount from the player and established a credit balance for the player; (2) received a player input for a play of a primary wagering game and an associated wager of credits from the player for the play of the primary wagering game; and (3) responsive to this input and this wager (that function as an occurrence of a game triggering event in this example), triggered the play of the primary wagering game. For the play of the primary wagering game, the EGM has also: (1) randomly determined a plurality of symbols (not labeled) of each of the reels 210, 220, 230, 240, and 250 to display at the respective symbol display positions (not labeled) associated with that reel; and (2) caused each of the reels 210, 220, 230, 240, and 250 to spin and to stop spinning to display those randomly determined symbols at the symbol display positions associated with those reels 210, 220, 230, 240, and 250. FIG. 2A displays the play of the primary wagering game after this has occurred.

In this example play of the game, there are no displayed set selector triggering symbols, so the EGM does not activate the set selector 300, does not removed any blocking elements, and does not provide any secondary award amounts.

In this example play of the game, the EGM additionally evaluates all of the symbols displayed by the reels 210, 220, 230, 240, and 250 for any winning symbol combination (such as along paylines or otherwise) to determine, display, and provide the player any awards based on those symbols.

Figure 2B:
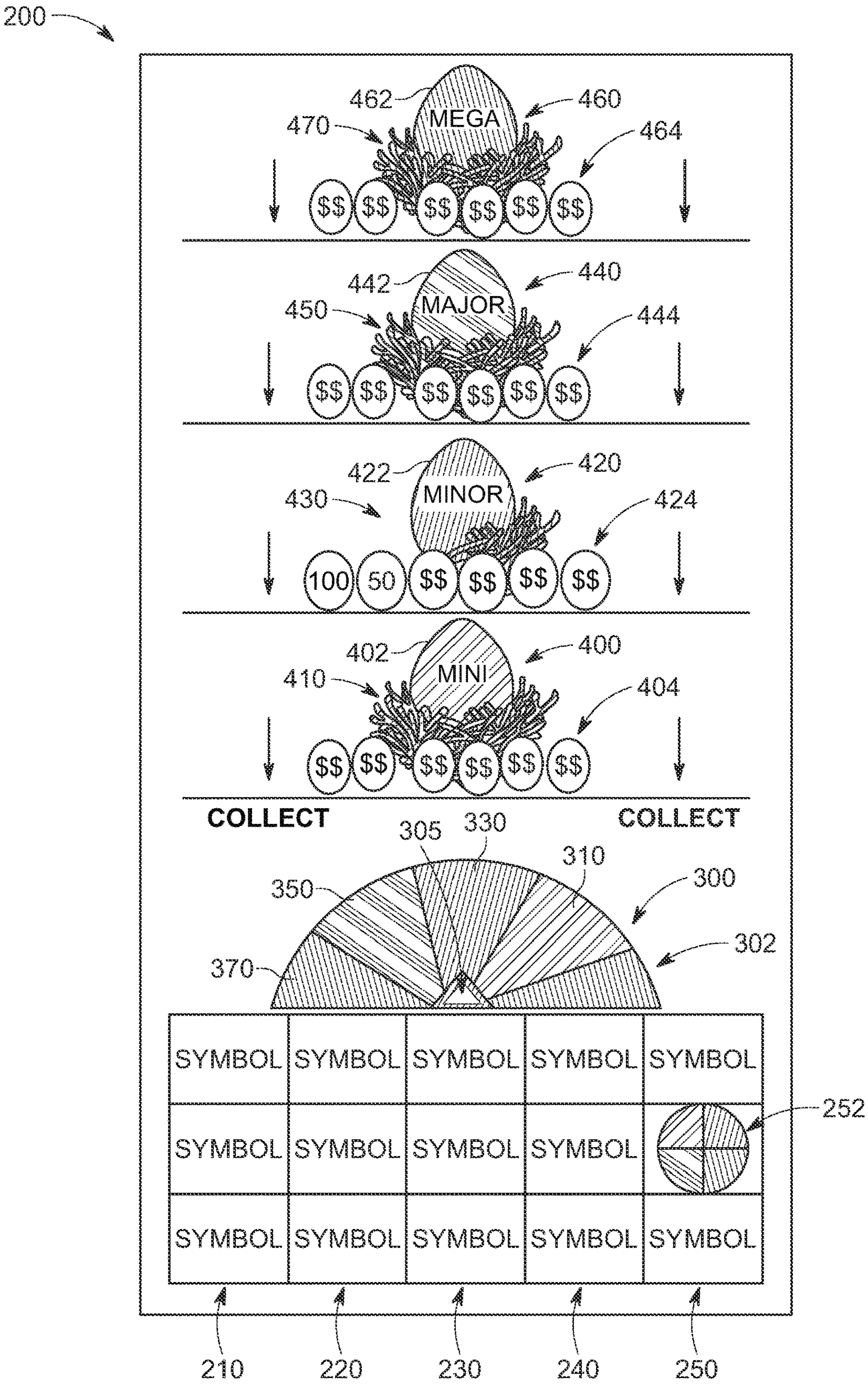

FIG. 2B shows part of a subsequent play of the wagering game where, the EGM has: (1) received a player input for a play of a primary wagering game and an associated wager of credits from the player for that play of the primary wagering game; (2) responsive to this input and this wager, triggered the play of the primary wagering game; (3) for the play of the primary wagering game, randomly determined a plurality of symbols (not labeled) of each of the reels 210, 220, 230, 240, and 250 to display at the respective symbol display positions associated with that reel; and (4) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 (that functions as a set selector triggering event) has occurred and is displayed on reel 250. It should be appreciated that the set selector triggering event can be any suitable event. Responsive to the set selector triggering symbol 252 occurring, the EGM has activated the set selector 300. This includes the EGM spinning and stopping of the pointer 305 to indicate one of the sections and particularly section 330 of the wheel 310 in this example. Section 330 in this example is associated with the aligned set 420, so the EGM determines to remove a quantity of blocking elements 430 associated with the aligned set 420 as shown in FIG. 2B. In this example play of the game, the EGM determines to remove half of the quantity of blocking elements 430 associated with the aligned set 420 as shown in FIG. 2B. This quantity can be determined in any suitable manner.

In this example play of the game, the EGM also determines to provide a quantity of secondary awards 424 associated with the aligned set 420 and/or the blocking elements 430 that are removed, as shown in FIG. 2B. In this example, the quantity is two and the award amounts are 100 credits and 50 credits. This quantity can be determined in any suitable manner.

In this example play of the game, the EGM additionally evaluates all of the symbols displayed by the reels 210, 220, 230, 240, and 250 for any winning symbol combinations (such as along paylines associated with the symbol display positions) to determine, display, and provide the player any awards based on those symbols.

Thus, the occurrence of the set selector triggering symbol 252 results in the activation and display of a selection by the set selector 302 of one of the aligned sets (via a respective one of the set selector indicators), a removal of a quantity of blocking elements of that aligned set, and the selection and provision of one or more of the secondary awards associated with that aligned set or removed blocking elements.

Figure 2C:
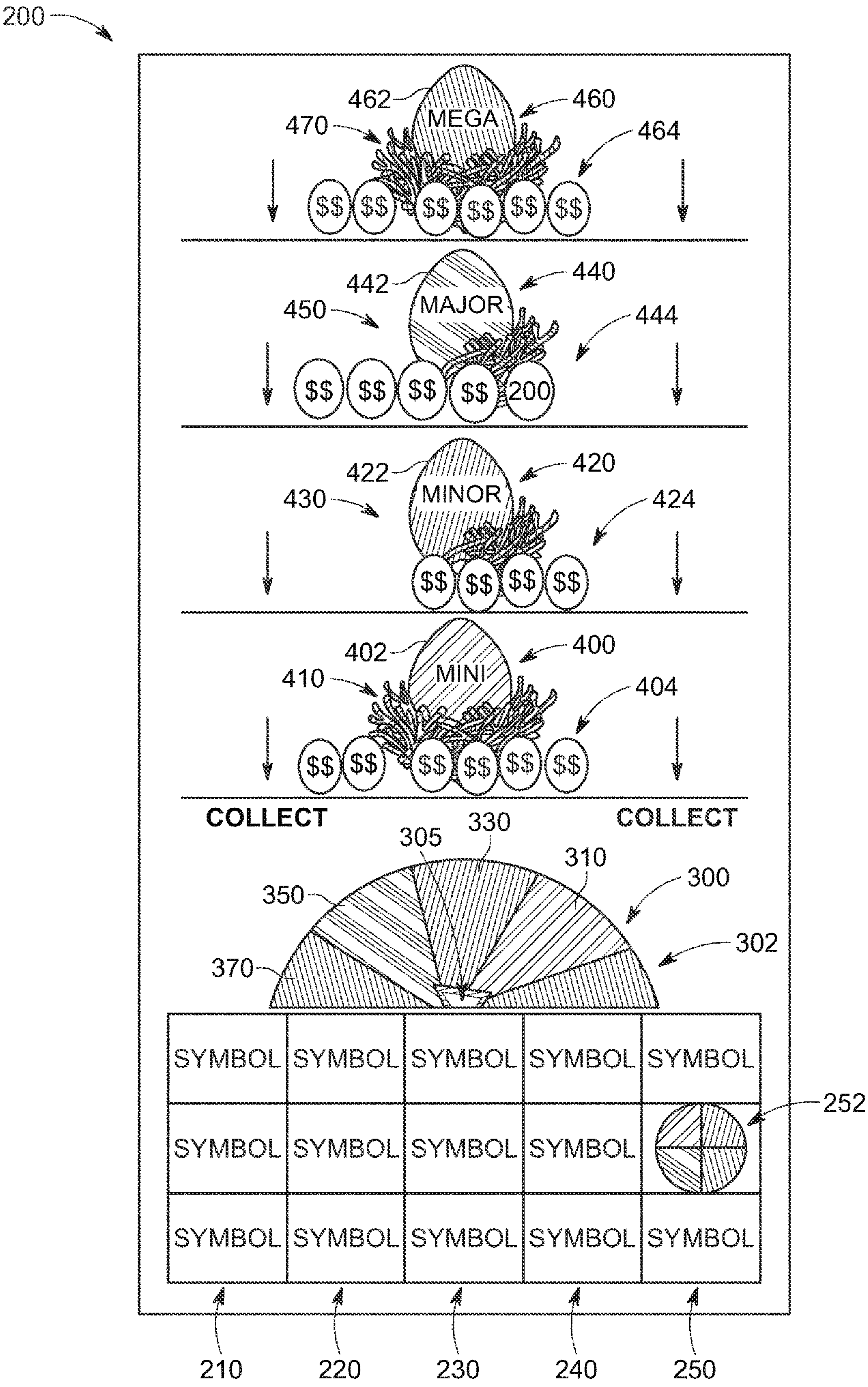

FIG. 2C shows part of a subsequent play of the wagering game where, the EGM has: (1) received a player input for a play of a primary wagering game and an associated wager of credits from the player for that play of the primary wagering game; (2) responsive to this input and this wager, triggered the play of the primary wagering game; (3) for the play of the primary wagering game, randomly determined a plurality of symbols of each of the reels 210, 220, 230, 240, and 250 to display at the respective symbol display positions associated with that reel; and (4) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 350 of the wheel 302 in this example. Section 350 in this example is associated with the aligned set 440. In this example, the EGM determines to remove a quantity of blocking elements 450 associated with the aligned set 440 as shown in FIG. 2C. In this example play of the game, the EGM determines to remove half of the quantity of blocking elements 450 associated with the aligned set 440 as shown in FIG. 2C. This quantity can be determined in any suitable manner.

In this example play of the game, the EGM also determines to provide a quantity of secondary awards 444 associated with the aligned set 440 as shown in FIG. 2C. In this example, the quantity is one and the award amount is 200 credits. This quantity can be determined in any suitable manner.

In this example play of the game, the EGM additionally evaluates all of the symbols displayed by the reels 210, 220, 230, 240, and 250 for any winning symbol combination (such as along paylines associated with the symbol display positions) to determine, display, and provide the player any awards based on those symbols.

Figure 2D:
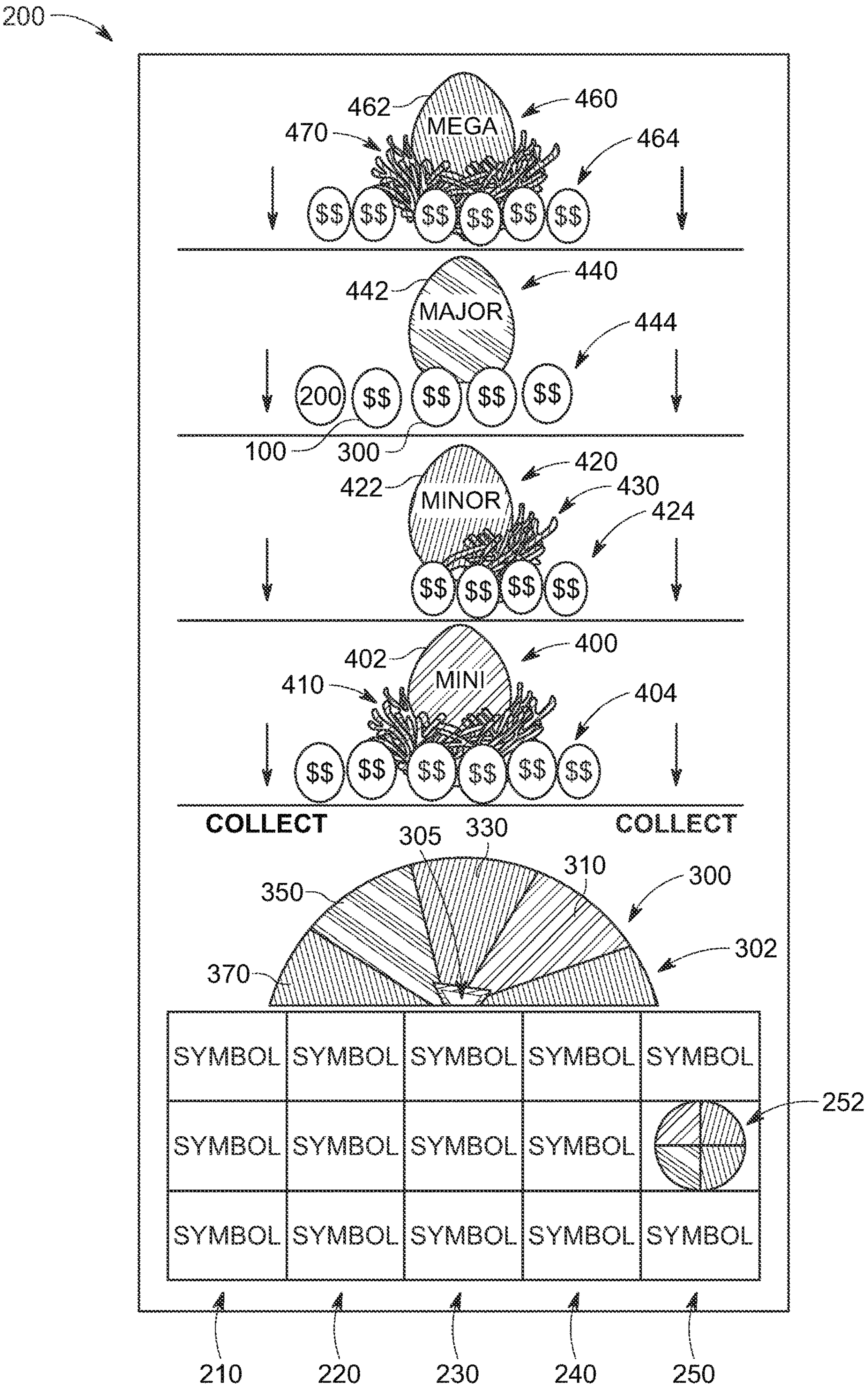

FIG. 2D shows part of a subsequent play of the wagering game where, the EGM has: (1) received a player input for a play of a primary wagering game and an associated wager of credits from the player for that play of the primary wagering game; (2) responsive to this input and this wager, triggered the play of the primary wagering game; (3) for the play of the primary wagering game, randomly determined a plurality of symbols of each of the reels 210, 220, 230, 240, and 250 to display at the respective symbol display positions associated with that reel; and (4) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 350 of the wheel 302 in this example. Section 350 in this example is associated with the aligned set 440. In this example, the EGM determines to remove a quantity of blocking elements 450 associated with the aligned set 440 as shown in FIG. 2D. In this example play of the game, the EGM determines to remove the remaining quantity of blocking elements 450 associated with the aligned set 440 as shown in FIG. 2D. This quantity can be determined in any suitable manner.

In this example play of the game, the EGM also determines to provide a quantity of secondary awards 444 associated with the aligned set 440 as shown in FIG. 2C. In this example, the quantity is three and the award amounts are 200 credit, 100 credits, and 300 credits. This quantity can be determined in any suitable manner.

Figure 2E:
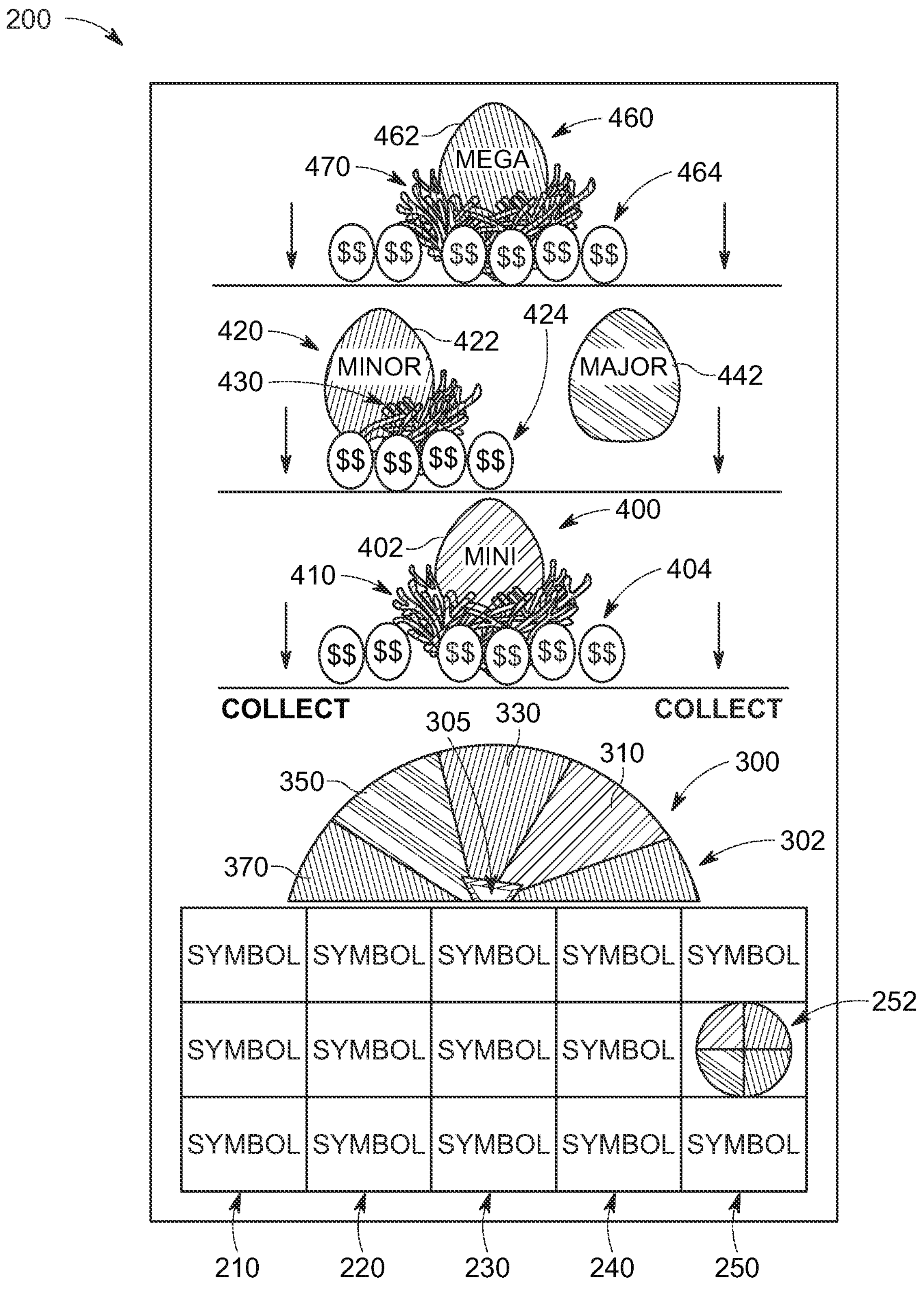

In this example play of the game, since the EGM has determined to remove all of blocking elements 450 for the aligned set 440, the EGM moves the primary award amount 442 to be at the same level as the aligned set 420 as shown in FIG. 2E. In other words, since all of the blocking elements 450 for the aligned set 440 have been removed, that primary award 442 of the aligned set 440 is released and moves downwardly to the lower level of the aligned set 420. This example shows how the primary awards are released to lower levels in this example embodiment of the present disclosure.

Figure 2F:
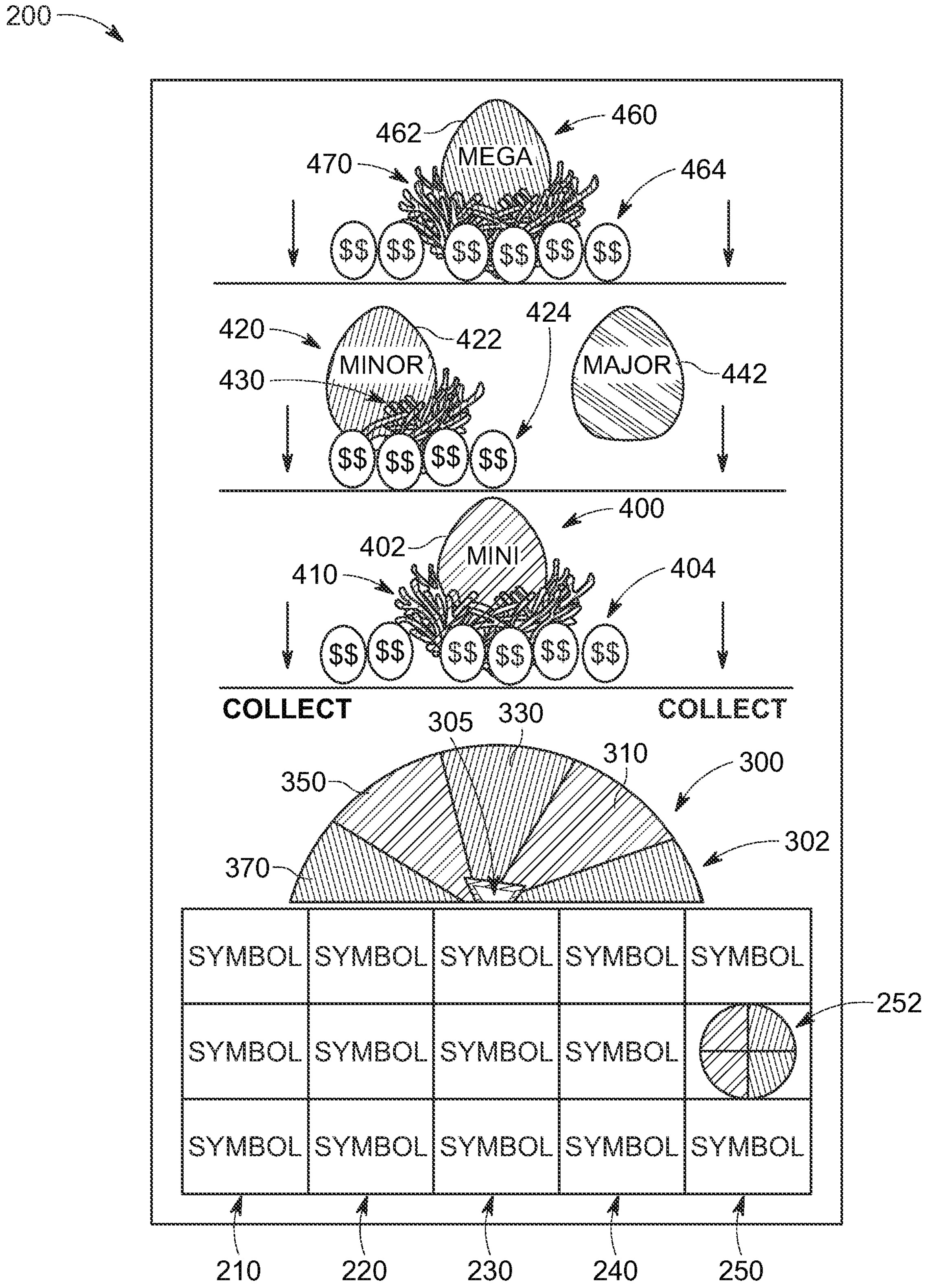

In this example play of the game, since the EGM has determined to remove all of blocking elements 450 for the aligned set 440, the EGM also changes the set selector 300 to remove the aligned set indicator for the aligned set 420 as shown in FIG. 2F.

In this example play of the game, the EGM additionally evaluates all of the symbols displayed by the reels 210, 220, 230, 240, and 250 for any winning symbol combination (such as along paylines associated with the symbol display positions) to determine, display, and provide the player any awards based on those symbols.

Figure 2G:
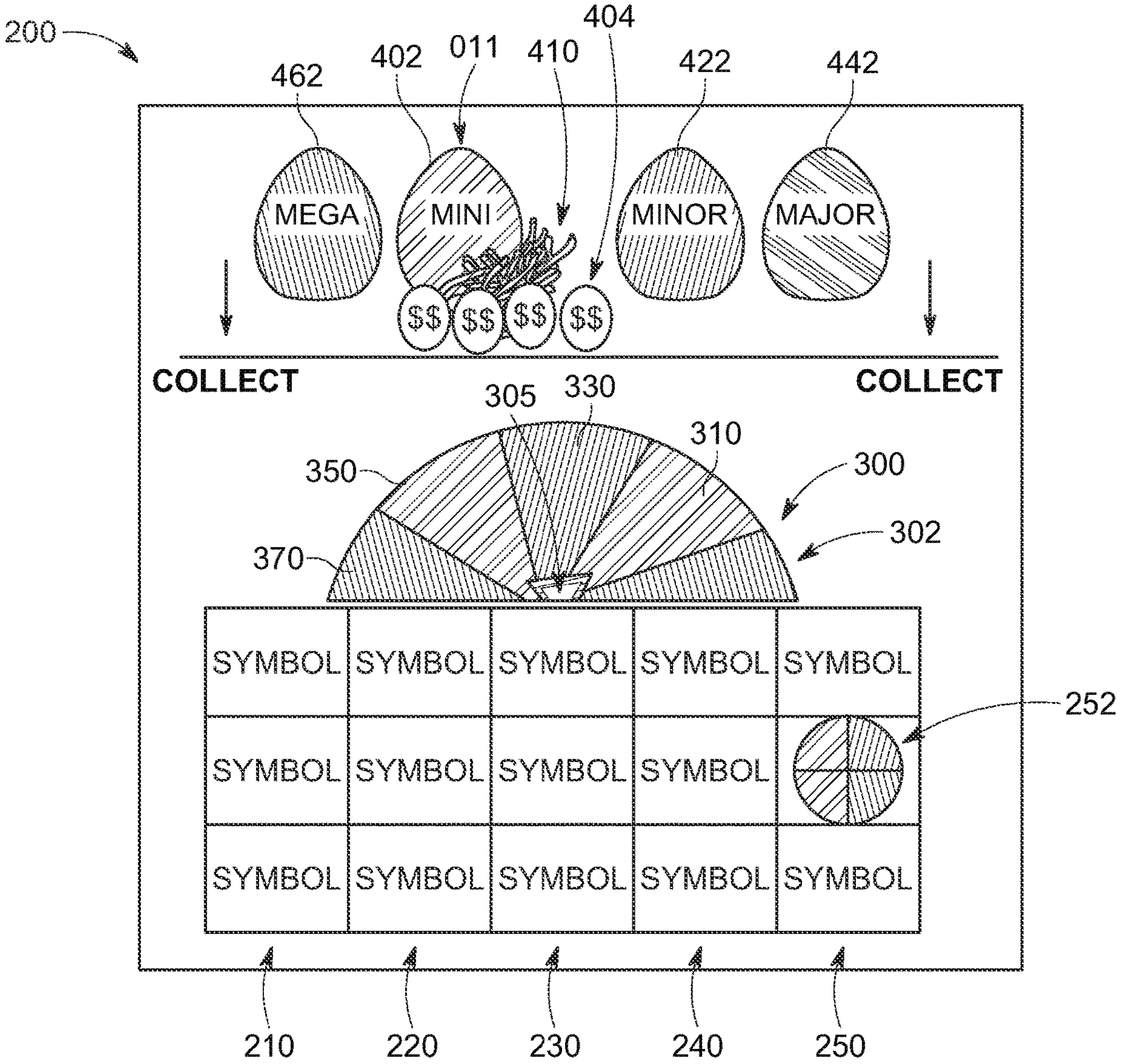

FIG. 2G shows part of a subsequent play of the wagering game. Prior to the start of this play of the game, plays of the wagering game between the play partly shown in FIGS. 2D, 2E, and 2F and this play shown in FIG. 2G have resulted in the removal of all of the blocking elements 470 for the aligned set 460, the removal of the remaining blocking elements 470 for the aligned set 420, and removal of part of the blocking elements 410 for the aligned set 400. These removals have caused the release of the primary award 462, the release of the primary award 442, and the further release of the primary award 452, such that all of the originally vertically primary awards 402, 422, 442, and 462 of the aligned sets 400, 420, 440, and 460 are now horizontally aligned and only blocked from all being released and thus provided to the player by the remaining blocking elements 410 associated with the aligned set 400.

For the play of the wagering game partly shown in FIG. 2G, the EGM has: (1) received a player input for a play of a primary wagering game and an associated wager of credits from the player for that play of the primary wagering game; (2) responsive to this input and this wager, triggered the play of the primary wagering game; (3) for this play of the primary wagering game, randomly determined a plurality of symbols of each of the reels 210, 220, 230, 240, and 250 to display at the respective symbol display positions associated with that reel; and (4) caused each of the reels 210, 220, 230, 240, and 250 to spin and to stop spinning to display those randomly determined symbols at the symbol display positions associated with those reels 210, 220, 230, 240, and 250.

Figure 2H:
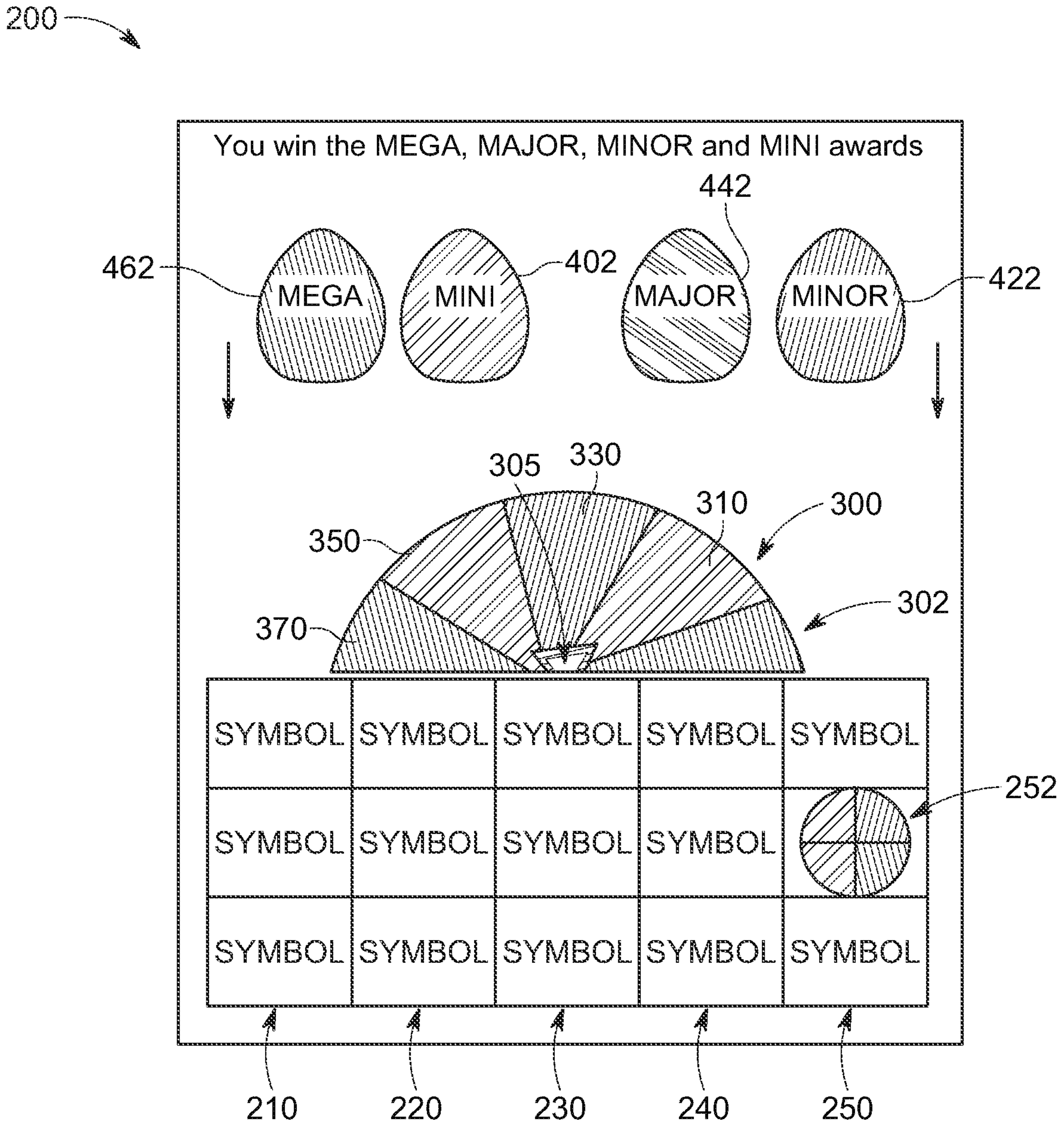

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 310 of the wheel 302 in this example. Section 310 in this example is associated with the aligned set 400. In this example, the EGM determines to remove a remaining quantity of blocking elements 410 associated with the aligned set 400 as shown in FIG. 2H. This quantity can be determined in any suitable manner. In this example, the EGM randomly determines this quantity.

Although not show, in this example play of the game, the EGM can also determine to provide a quantity of the secondary awards 404 associated with the aligned set 400. This quantity can be determined in any suitable manner.

In this example play of the game, since the EGM has determined to remove all of blocking elements 410 for the aligned set 400, the EGM has now removed all of the blocking elements 410 and releases and thus provides all of the primary awards 402, 422, 442, and 462 to the player. In other words, since all of the blocking elements for all of the aligned sets have been removed, the primary awards of those aligned set are no longer blocked and thus released and provided to the player.

In this example play of the game, the EGM additionally evaluates all of the symbols displayed by the reels 210, 220, 230, 240, and 250 for any winning symbol combination (such as along the paylines associated with the symbol display positions) to determine, display, and provide to the player any awards based on those symbols.

It should be appreciated from this example embodiment, that the if one or more of the primary awards 422, 442, and 462 are not released and thus provided to the player when the primary award 402 is released and provided to the player, at least the release of any of the blocking elements associated with those primary awards resulted in the provision of one or more secondary awards of the respective aligned sets. Thus, the reset of the blocking elements for the aligned sets after the primary award 402 is won is not a completely negative event for the player.

FIGS. 2I, 2J, 2K, and 2L illustrate screen shots of parts of a plurality of example plays of a primary wagering game of another example embodiment of the present disclosure on a gaming system such as an EGM.

The EGM displays via a display device 200, a plurality of adjacently arranged video reels 210, 220, 230, 240, and 250 configured to display a plurality of symbols (on those video reels) at a plurality of symbol display positions (not labeled) respectively associated with the plurality of reels 210, 220, 230, 240, and 250.

The EGM also displays via the display device 200 a plurality of different aligned sets at a same level including: (1) a first aligned set (not labeled) associated with multiple primary award amounts 402A, 402B, and 402C (indicated by the MINI labels), and a plurality of blocking elements (not individually labeled); (2) a second aligned set (not labeled) associated with two primary award amounts 422A and 422B (indicated by the MINOR labels), and a plurality of blocking elements (not individually labeled); (3) a third aligned set (not labeled) associated with a primary award amount 442 (indicated by the MAJOR label), and a plurality of blocking elements (not individually labeled); and (4) a fourth aligned set (not labeled) associated with a primary award amount 462 (indicated by the MEGA label), and a plurality of blocking elements (not individually labeled). In this example embodiment, two of the aligned sets include multiple primary awards. The quantity of aligned sets and the quantity of blocking elements for each aligned set can vary in accordance with the present disclosure. It should thus be appreciated that various embodiments of the present disclosure contemplates multiple primary awards being part of one or more of the aligned sets. The quantity of primary awards can be determined in any suitable manner such as randomly or in predetermined manner.

In this example embodiment, the EGM displays via the display device 200 a plurality of secondary awards 480 (not individually labeled) associated with all of the aligned sets. In this example, the secondary awards are not specifically associated with the individual aligned sets as in the above example embodiment (but can be in other various embodiments).

In this example embodiment, the EGM displays via the display device 200 a plurality of the blocking elements 490 (not individually labeled). In this example, the blocking elements are associated with the individual aligned sets as in the above example embodiment (but can be associated with all of the aligned sets or certain groups of the aligned sets in other various embodiments).

In this example embodiment, the blocking elements for each of the primary awards of that aligned set prevent the respective primary award(s) from being released, but do not prevent the primary awards of any of the other aligned sets from being released. For each aligned set, when all of the blocking elements for that aligned set are removed, that primary award(s) of that aligned set is/are released to the player instead of being released to another level (as in the above described embodiment).

In this example embodiment, the EGM displays via the display device 200 a changeable set selector 300 between the reels and the aligned sets. In this example embodiment, the set selector 300 includes a wheel 302 and a pointer 305. The wheel 302 initially includes a plurality of different sections (such as sections 310, 330, 350, and 370) that include aligned set indicators. Each section of the wheel 302 is this example embodiment is initially associated with a separate aligned set indicator (such as the respective illustrated different cross-hatchings for the aligned set indicators and sections of the wheel 302). The aligned set indicators can be any suitable indicators. In other embodiments, one or more of the sections of the set selector can be associated with multiple aligned sets (as indicated by respective aligned set indicators). The pointer 305 is configured to move, stop, and then indicate one of the sections of the wheel 302 after a set selector triggering event occurs in the play of the game.

Figure 2I:
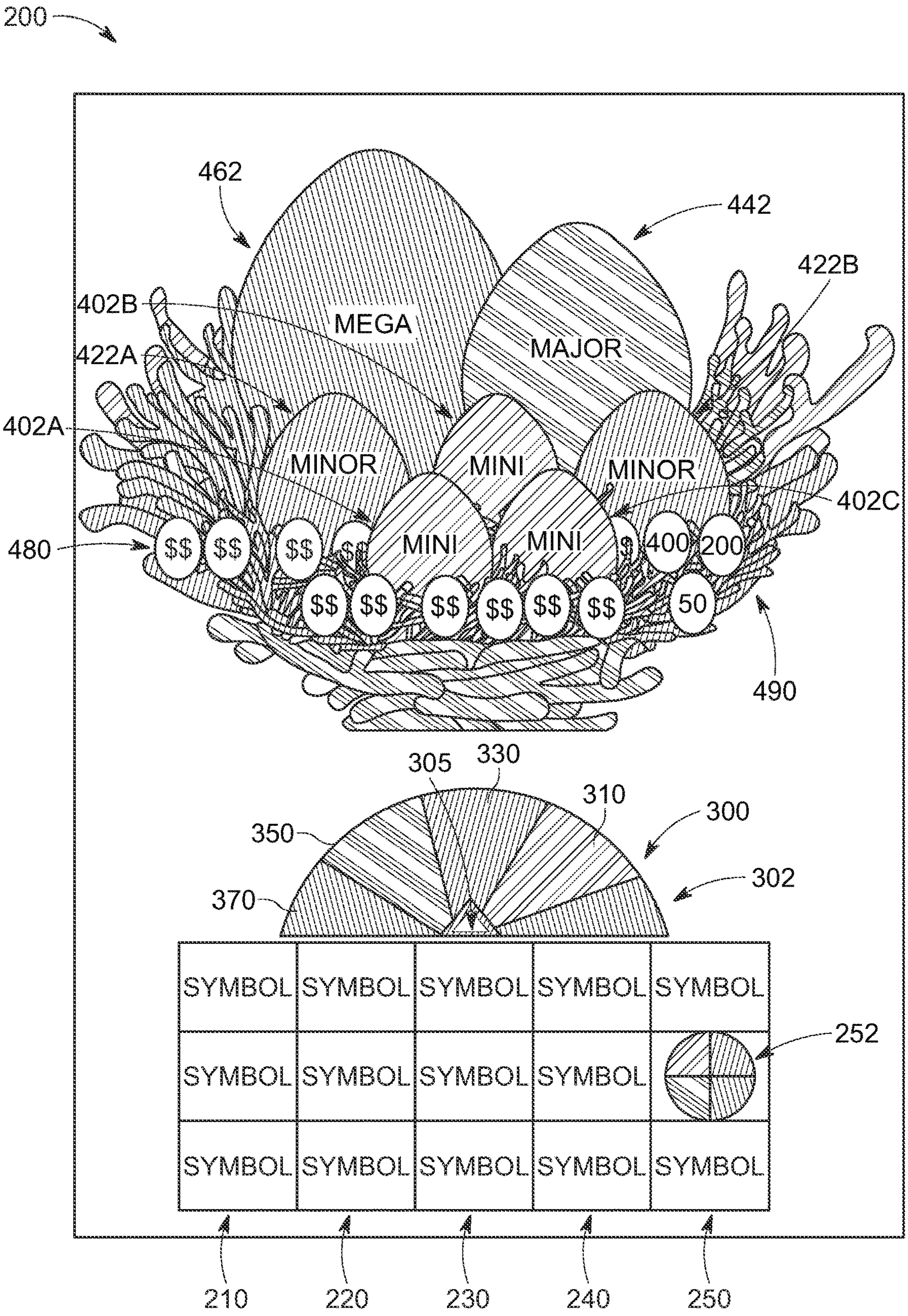
FIGS. 2I, 2J, 2K, and 2L are front views of a display device displaying portions of multiple plays of a primary wagering game including a changeable set selector for multiple aligned sets and underlying symbol displays in accordance with another example embodiment of the present disclosure.

For the example game play partly shown in FIG. 2I, the EGM has: (1) received a player input for a play of a primary wagering game and an associated wager of credits from the player for the play of the primary wagering game; and (2) responsive to this input and this wager (that function as an occurrence of a game triggering event in this example), triggered the play of the primary wagering game. For the play of the primary wagering game, the EGM has also: (1) randomly determined a plurality of symbols (not labeled) of each of the reels 210, 220, 230, 240, and 250 to display at the respective symbol display positions (not labeled) associated with that reel; and (2) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 330 of the wheel 302 in this example. Section 330 in this example is associated with the MINOR primary awards. In this example, the EGM determines to remove a quantity but not all of blocking elements 490 that are associated with the primary award 422B as shown in FIG. 2I. This quantity can be determined in any suitable manner. In this example, the EGM randomly determines this quantity. The remaining blocking elements prevent the release of the MINOR primary awards 422A and 422B.

In this example play of the game, the EGM also determines to provide a quantity of the secondary awards 480 as shown in FIG. 2I. In this example, the quantity is three and the secondary award amounts are 400 credit, 200 credits, and 50 credits. This quantity can be determined in any suitable manner.

In this example play of the game, the EGM additionally evaluates all of the symbols displayed by the reels 210, 220, 230, 240, and 250 for any winning symbol combination (such as along paylines or otherwise) to determine, display, and provide the player any awards based on those symbols.

Figure 2J:
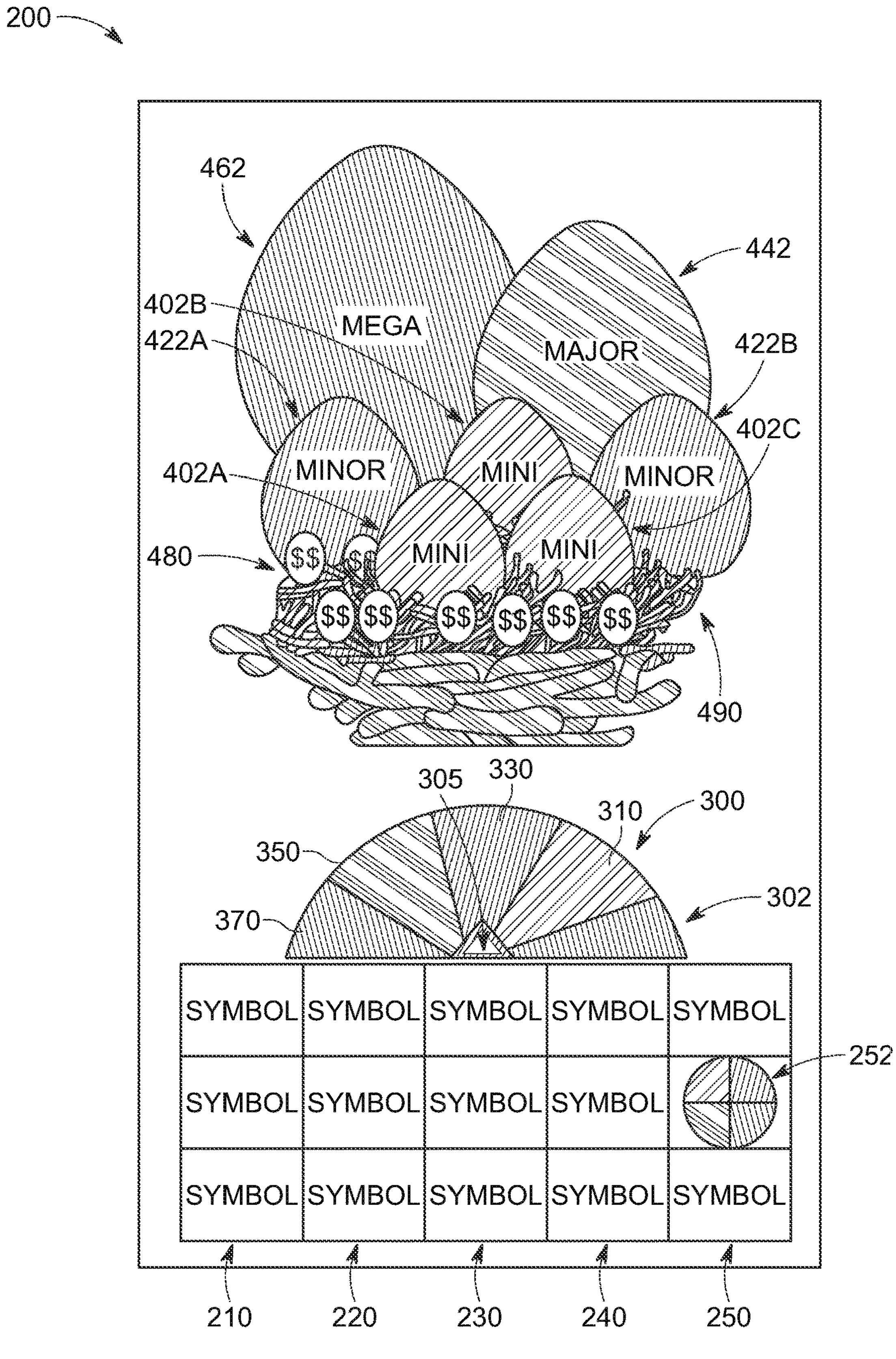

For the example game play partly shown in FIG. 2J, the EGM has: (1) received a player input for a play of a primary wagering game and an associated wager of credits from the player for the play of the primary wagering game; and (2) responsive to this input and this wager (that function as an occurrence of a game triggering event in this example), triggered the play of the primary wagering game. For the play of the primary wagering game, the EGM has also: (1) randomly determined a plurality of symbols (not labeled) of each of the reels 210, 220, 230, 240, and 250 to display at the respective symbol display positions (not labeled) associated with that reel; and (2) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 330 of the wheel 302 again in this example. Section 330 in this example is associated with the MINOR primary awards. In this example, the EGM determines to remove a quantity equal to the remaining quantity of blocking elements 490 that are associated with the primary awards 422A and 422B as indicated by the outward positions of the primary awards 422A and 422B shown in FIG. 2K. This quantity can be determined in any suitable manner. In this example, the EGM randomly determines this quantity. Since these remaining blocking elements are removed, the EGM releases the MINOR primary awards 422A and 422B as further indicated in FIGS. 2K and 2L, and provides these primary awards 422A and 422B to the player.

In this example play of the game, the EGM does not provide any secondary awards 480 since these primary awards 422A and 422B are provided to the player.

In this example play of the game, the EGM additionally evaluates all of the symbols displayed by the reels 210, 220, 230, 240, and 250 for any winning symbol combination (such as along paylines or otherwise) to determine, display, and provide the player any awards based on those symbols.

Figure 2K:
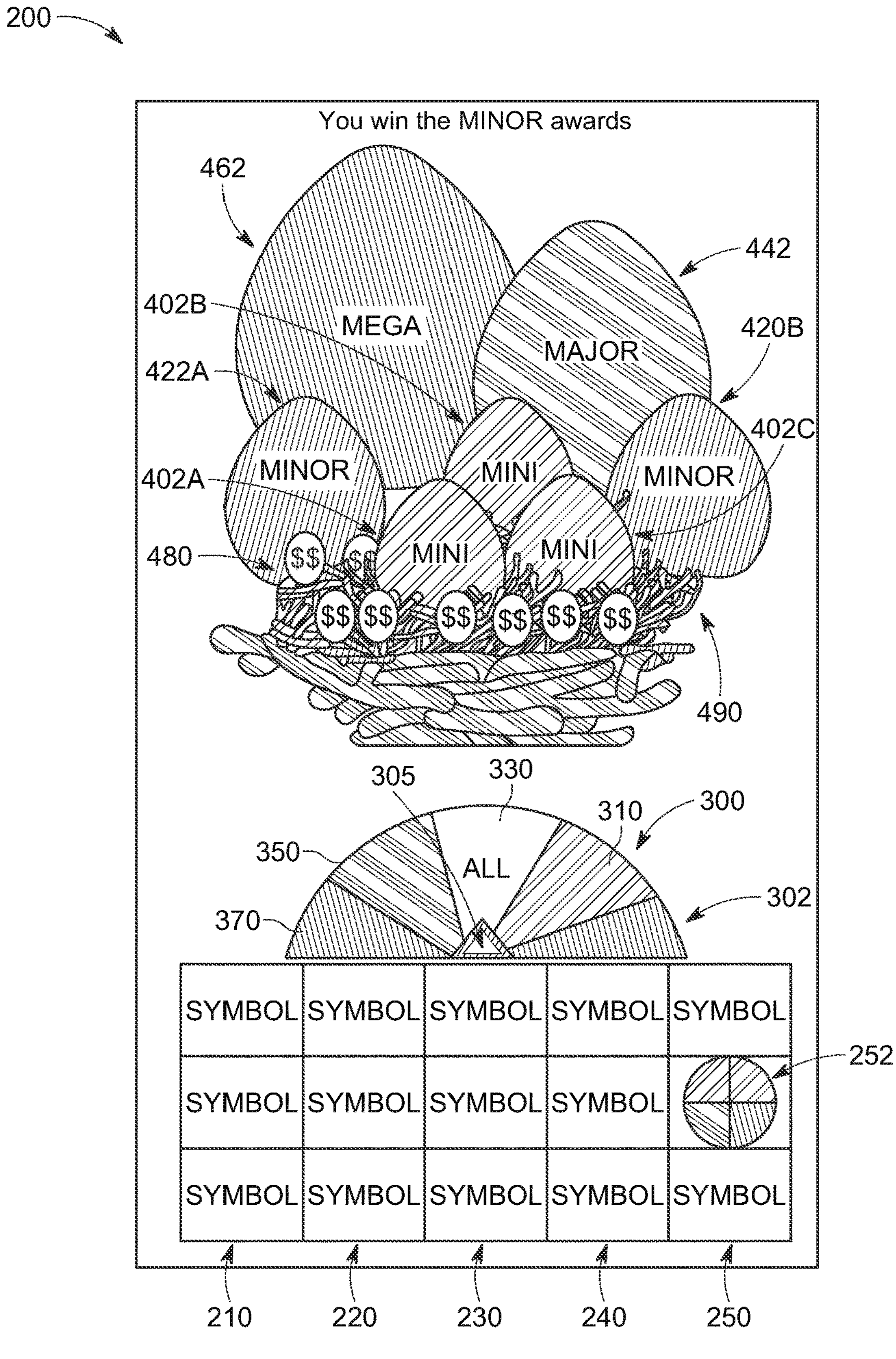

In this example embodiment, because the MINOR primary awards 422A and 422B have been provided, the EGM changes the sections of the set selector 300 to eliminate the sections associated with those primary awards. In this example embodiment, the EGM changes sections associated with the MINOR primary awards 422A and 422B. In this example embodiment, the EGM changes section 330 to be an "ALL" indication associated with all of the remaining aligned sets and/or blocking elements as shown in FIG. 2K.

Figure 2L:
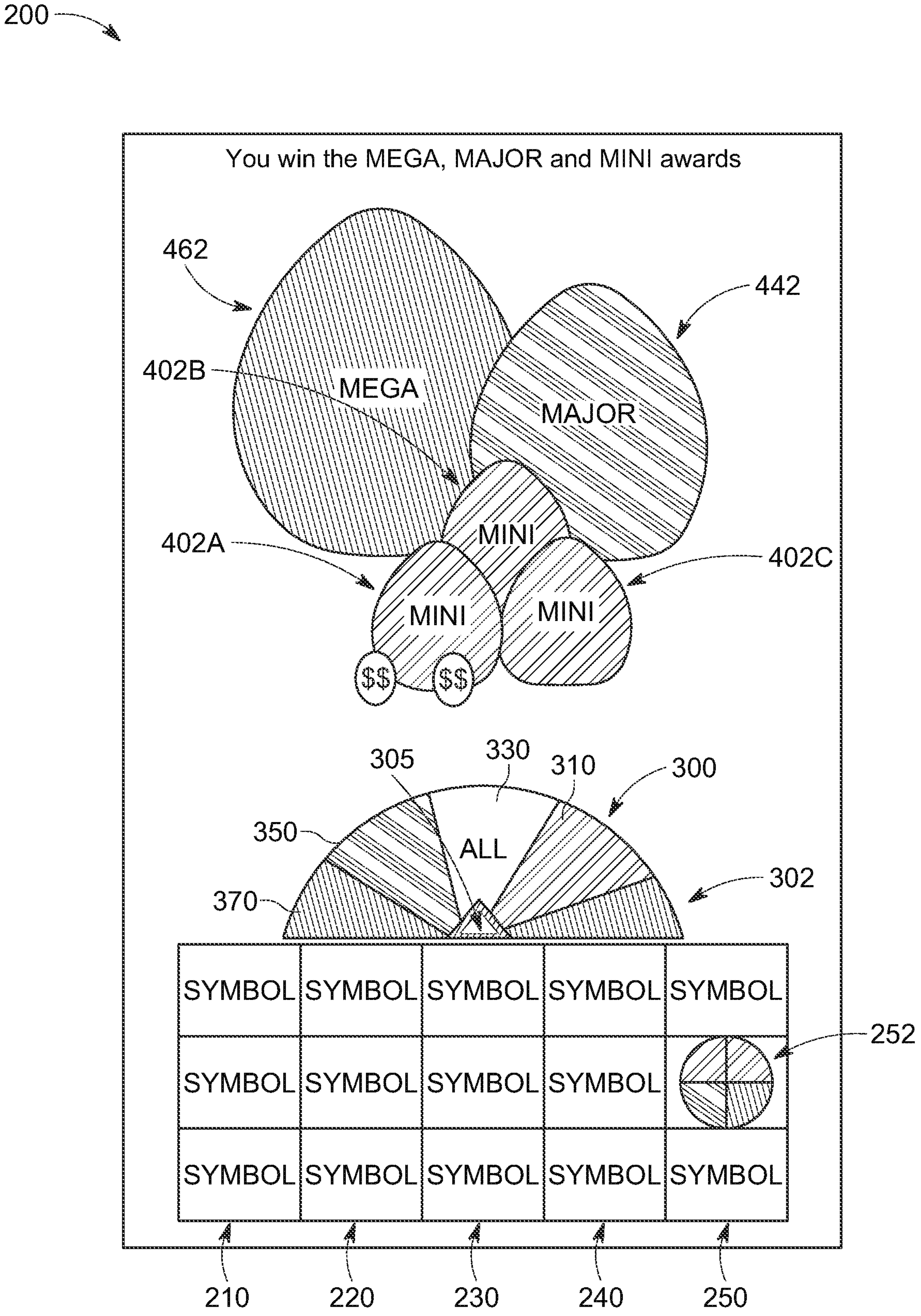

For the example game play partly shown in FIG. 2L, the EGM has: (1) received a player input for a play of a primary wagering game and an associated wager of credits from the player for the play of the primary wagering game; and (2) responsive to this input and this wager (that function as an occurrence of a game triggering event in this example), triggered the play of the primary wagering game. For the play of the primary wagering game, the EGM has also: (1) randomly determined a plurality of symbols (not labeled) of each of the reels 210, 220, 230, 240, and 250 to display at the respective symbol display positions (not labeled) associated with that reel; and (2) caused each of the reels 210, 220, 230, 240, and 250 to spin and to stop spinning to display those randomly determined symbols at the symbol display positions associated with those reels 210, 220, 230, 240, and 250.

In this example play of the game, the set selector triggering symbol 252 has occurred and is displayed on reel 250, and responsive thereto, the EGM has activated the set selector 300. This includes spinning and stopping of the pointer 305 to indicate one of the sections and particularly section 330 of the wheel 302 again in this example. Section 330 in this example is now associated all of the primary awards. In this example, the EGM determines to remove all of the blocking elements 490 that are associated with all of the remaining primary awards 402A, 402B, 402C, 442, and 462 as shown in FIG. 2L. Since these remaining blocking elements are removed, the EGM releases all of remaining primary awards 402A, 402B, 402C, 442, and 462 as shown in FIG. 2L, and provides these primary awards 402A, 402B, 402C, 442, and 462 to the player.

In this example play of the game, the EGM does not provide any secondary awards 480 since these primary awards 402A, 402B, 402C, 442, and 462 are provided to the player.

In this example play of the game, the EGM additionally evaluates all of the symbols displayed by the reels 210, 220, 230, 240, and 250 for any winning symbol combination (such as along paylines or otherwise) to determine, display, and provide the player any awards based on those symbols.

Since all of primary awards 402A, 402B, 402C, 442, and 462 have been released and provided to the player, the EGM resets all of the aligned sets.

It should be appreciated from the above that various embodiments of the present disclosure provide a gaming system configured to: (1) cause a display, by a display device, of a plurality of symbol displays; (2) cause a display, by the display device, of a plurality of aligned sets, each aligned set comprising a primary award indicator and a quantity of blocking elements, the quantity being at least one; (3) cause a display, by the display device, of a set selector; and (4) cause a display, by the display device, of a plurality of set selector triggering events associated with a plurality of activations of the symbol displays, and which comprises for each of the plurality of set selector triggering events: a display, by the display device, of an activation of the set selector and indication by the set selector of one of the aligned sets; and a display, by the display device, of one of: (a) an indication of no removal of any blocking elements for the indicated aligned set, (b) an indication of a removal of a quantity of blocking elements for the indicated aligned set, (c) an indication of a removal of a quantity of blocking elements for the indicated aligned set and a release of the indicated aligned set, (d) an indication of a removal of a quantity of blocking elements for the indicated aligned set and a release of the indicated aligned set and any previously released aligned sets also associated with the indicated aligned set, and (e) an indication of a removal of a quantity of blocking elements for the indicated aligned set, a release of the indicated aligned set and any previously released aligned sets associated with the indicated aligned set, and an indication of a provision of the primary award associated with the indicated aligned set and the primary award associated with each previously released aligned set also associated with the indicated aligned set. In various such embodiments, the gaming system is further configured to cause a display, by the display device, of the plurality of aligned sets in an upright top to bottom order. In various such embodiments, the gaming system is further configured to cause a display, by the display device, of the plurality of aligned sets in an upright bottom to top order. In various such embodiments, the gaming system is further configured to cause a display, by the display device, of the plurality of aligned sets in the highest primary award amount to a lowest primary award amount order. In various such embodiments, the gaming system is further configured to cause a display, by the display device, of the plurality of aligned sets in the lowest primary award amount to a highest primary award amount order. In various such embodiments, the gaming system is further configured to cause a display, by the display device, of the plurality of aligned sets initially at different levels. In various such embodiments, the gaming system is further configured to cause a display, by the display device, of an indication by the set selector of one of the aligned sets causing an indication of a removal of a quantity of blocking elements for the indicated aligned set and a release of indicated aligned sets such that all of the aligned sets are at a same level. In various such embodiments, the gaming system is further configured to cause a display, by the display device, of an indication by the set selector of one of the aligned sets causing an indication of a removal of a quantity of blocking elements for the indicated aligned set and a release of the indicated aligned set such that all of the aligned sets are blocked by the blocking elements of one of the aligned sets. In various such embodiments, the gaming system is further configured to cause a display, by the display device, of a removal of all of the blocking elements that block release of all of the aligned sets and a release of all of the aligned sets. In various such embodiments, the gaming system is further configured to cause a display, by the display device, of an indication by the set selector of one of the aligned sets causing an indication of a removal of a quantity of blocking elements for the indicated aligned set and a release of all of the aligned sets.

It should further be appreciated from the above that various embodiments of the present disclosure provide a gaming system configured to: (1) cause a display, by the display device, of a plurality of aligned sets, each aligned set comprising a primary award amount, a first quantity of secondary award indicators, and a second quantity of blocking elements, the first quantity being at least one, the second quantity being at least one; (2) cause a display, by the display device, of a set selector; and (3) cause a display, by the display device, of a plurality of set selector triggering events, and which comprises for each of the plurality of set selector triggering events: a display, by the display device, of an activation of the set selector and indication by the set selector of one of the aligned sets; and a display, by the display device, of one of: (a) an indication of no removal of any blocking elements for the indicated aligned set, (b) an indication of a removal of a quantity of blocking elements for the indicated aligned set, and an indication of one of the secondary award indicators of the indicated aligned set, (c) an indication of a removal of a quantity of blocking elements for the indicated aligned set and a release of the indicated aligned set, (d) an indication of a removal of a quantity of blocking elements for the indicated aligned set and a release of the indicated aligned set and any previously released aligned sets associated with the indicated aligned set, and (e) an indication of a removal of a quantity of blocking elements for the indicated aligned set, a release of the indicated aligned set and any previously released aligned sets associated with the indicated aligned set, and an indication of a provision of the primary award associated with the indicated aligned set and the primary award associated with each previously released aligned set associated with the indicated aligned set. In various such embodiments, the gaming system is further configured to cause a display, by the display device, of the plurality of aligned sets in one of an upright top to bottom order, an upright bottom to top order, the highest primary award amount to a lowest primary award amount order, and the lowest primary award amount to a highest primary award amount order. In various such embodiments, the gaming system is further configured to cause a display, by the display device, of the plurality of aligned sets at different levels. In various such embodiments, the blocking elements are perceived persistence blocking elements. In various such embodiments, the blocking elements are actual persistence blocking elements.

It should further be appreciated from the above that various embodiments of the present disclosure provide a gaming system configured to: (1) cause a display, by a display device, of a plurality of aligned sets, each aligned set comprising a primary award and a quantity of blocking elements, the first quantity being at least one, the quantity being at least one; (2) cause a display, by a display device, of a plurality of secondary award indicators associated with the aligned sets; (3) cause a display, by the display device, of a set selector; and (4) cause a display, by the display device, of a plurality of set selector triggering events, and which comprises for each of the plurality of set selector triggering events: a display, by the display device, of an activation of the set selector and indication by the set selector of one of the aligned sets; and a display, by the display device, of one of: (a) an indication of no removal of any blocking elements for the indicated aligned set and a display of an indication of one or more of the secondary award indicators, (b) an indication of a removal of a quantity of blocking elements for the indicated aligned set, (c) an indication of a removal of a quantity of blocking elements for the indicated aligned set and a release of the indicated aligned set, (d) an indication of a removal of a quantity of blocking elements for the indicated aligned set and a release of the indicated aligned set and any previously released aligned sets associated with the indicated aligned set, and (e) an indication of a removal of a quantity of blocking elements for the indicated aligned set, a release of the indicated aligned set and any previously released aligned sets associated with the indicated aligned set, and an indication of a provision of the primary award associated with the indicated aligned set and the primary award associated with each previously released aligned set associated with the indicated aligned set. In various such embodiments, the gaming system is further configured to cause a display, by the display device, of the plurality of aligned sets in one of an upright top to bottom order, an upright bottom to top order, the highest primary award amount to a lowest primary award amount order, and the lowest primary award amount to a highest primary award amount order. In various such embodiments, the gaming system is further configured to cause a display, by the display device, of the plurality of aligned sets at different levels. In various such embodiments, the blocking elements are perceived persistence blocking elements. In various such embodiments, the blocking elements are actual persistence blocking elements.

It should further be appreciated from the above that various embodiments of the present disclosure provide a gaming system configured to: (1) cause a display, by a display device, of a plurality of symbol displays; (2) cause a display, by the display device, of a plurality of aligned sets, each aligned set comprising a primary award indicator and a quantity of blocking elements, the quantity being at least one; (3) cause a display, by the display device, of a set selector, the set selector comprising, for each of the aligned sets, an aligned set indicator for that aligned set; and (4) cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set, (b) an indication of a removal of a quantity of blocking elements for the indicated aligned set, and (c) an indication of a removal of a quantity of blocking elements for the indicated aligned set, a release of the indicated aligned set, and a change to the changeable set selector comprising removing any of the aligned set indicators for the indicated aligned set from the set selector. In various such embodiments, the gaming system is further configured to cause a display, by the display device, of the plurality of aligned sets in one of: an upright top to bottom order, an upright bottom to top order, the highest primary award amount to a lowest primary award amount order, the lowest primary award amount to a highest primary award amount order. In various such embodiments, the gaming system is further configured to cause a display, by the display device, of the plurality of aligned sets initially at different levels. In various such embodiments, the gaming system is further configured to cause a display, by the display device, of the plurality of aligned sets initially at a same level. In various such embodiments, the gaming system is further configured to cause a display, by the display device, of a display, of the change to the changeable set selector comprises adding one of the aligned set indicators, for one the aligned sets not released, to the set selector. In various such embodiments, the gaming system is further configured to cause a display, by the display device, of a display, of the change to the changeable set selector comprises adding a plurality of aligned set indicators, for one the aligned sets not released, to the set selector. In various such embodiments, the gaming system is further configured to cause a display, by the display device, of a display, of the change to the changeable set selector comprises adding a plurality of different aligned set indicators, for a plurality of different ones of the aligned sets not released, to the set selector. In various such embodiments, the gaming system is further configured to cause a display, by the display device, of a display, of the change to the changeable set selector comprises adding an aligned set indicator, for a plurality of different ones of the aligned sets not released, to the set selector. In various such embodiments, the gaming system is further configured to cause a display, by the display device, of a display, of the change to the changeable set selector comprises adding an aligned set indicator, for all of the aligned sets not released, to the set selector. In various such embodiments, the blocking elements are perceived persistence blocking elements. In various such embodiments, the blocking elements are actual persistence blocking elements.

It should further be appreciated from the above that various embodiments of the present disclosure provide a gaming system configured to: (1) cause a display, by the display device, of a plurality of aligned sets, each aligned set comprising a primary award indicator, a first quantity of secondary award indicators, and a second quantity of blocking elements, the first quantity being at least one, the second quantity being at least one; (2) cause a display, by the display device, of a set selector, the set selector comprising, for each of the aligned sets, an aligned set indicator for that aligned set; and (3) cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set and of an indication of a provision of one or more of the secondary award indicators, (b) an indication of a removal of a quantity of blocking elements for the indicated aligned set, and (c) an indication of a removal of a quantity of blocking elements for the indicated aligned set, a release of the indicated aligned set, and a change to the changeable set selector comprising removing any of the aligned set indicators for the aligned set from the set selector. In various such embodiments, the gaming system is further configured to cause a display, by the display device, of a display, of the change to the changeable set selector comprises adding one of the aligned set indicators, for one the aligned sets not released, to the set selector. In various such embodiments, the gaming system is further configured to cause a display, by the display device, of a display, of the change to the changeable set selector comprises adding a plurality of different aligned set indicators, for a plurality of different ones of the aligned sets not released, to the set selector. In various such embodiments, the gaming system is further configured to cause a display, by the display device, of a display, of the change to the changeable set selector comprises adding an aligned set indicator, for a plurality of different ones of the aligned sets not released, to the set selector.

It should further be appreciated from the above that various embodiments of the present disclosure provide a gaming system configured to: (1) cause a display, by a display device, of a plurality of aligned sets, each aligned set comprising a primary award indicator, a first quantity of blocking elements, the first quantity being at least one; (2) cause a display, by the display device, of a second quantity secondary award indicators, the second quantity being at least one; (3) cause a display, by the display device, of a set selector, the set selector comprising, for each of the aligned sets, an aligned set indicator for that aligned set; and (4) cause a display, by the display device, of a plurality of set selector triggering events associated with a plurality of activations of the symbol displays, and which comprises after each of the plurality of set selector triggering events: a display, by the display device, of an activation of the set selector and indication by the set selector of one of the aligned sets by one of the aligned set indicators; and a display, by the display device, of one of: (a) an indication of no removal of any blocking elements for the indicated aligned set, (b) an indication of a removal of a quantity of blocking elements for the indicated aligned set and of an indication of a provision of one or more of the secondary award indicators, and (c) an indication of a removal of a quantity of blocking elements for the indicated aligned set, a release of the indicated aligned set, and a change to the changeable set selector comprising removing any of the aligned set indicators for the aligned set from the set selector. In various such embodiments, the gaming system is further configured to cause a display, by the display device, of a display, of the change to the changeable set selector comprises adding one of the aligned set indicators, for one the aligned sets not released, to the set selector. In various such embodiments, the gaming system is further configured to cause a display, by the display device, of a display, of the change to the changeable set selector comprises adding a plurality of different aligned set indicators, for a plurality of different ones of the aligned sets not released, to the set selector. In various such embodiments, the gaming system is further configured to cause a display, by the display device, of a display, of the change to the changeable set selector comprises adding an aligned set indicator, for a plurality of different ones of the aligned sets not released, to the set selector. In various such embodiments, the gaming system is further configured to cause a display, by the display device, of a display, of the change to the changeable set selector comprises adding an aligned set indicator, for all of the aligned sets not released, to the set selector.

It should also be appreciated from the above that the present disclosure provides various technical improvement to gaming technology at least including: (a) new graphical displays for the aligned sets, blocking elements, primary and secondary awards indicators, the changeable set selector, and combinations thereof; and (b) new interactions and combinations of aligned sets, blocking elements, primary and secondary awards indicators, a changeable set selector.

It should be appreciated that in different embodiments any determination of the present disclosure is/are predetermined, randomly determined, randomly determined based on one or more weighted percentages, determined based on a symbol or symbol combination, determined independent of any symbols or symbol combinations, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games and displays those plays via the Internet browser of the EGM (or personal gaming device).

The server and the EGM (or personal gaming device) are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3B:
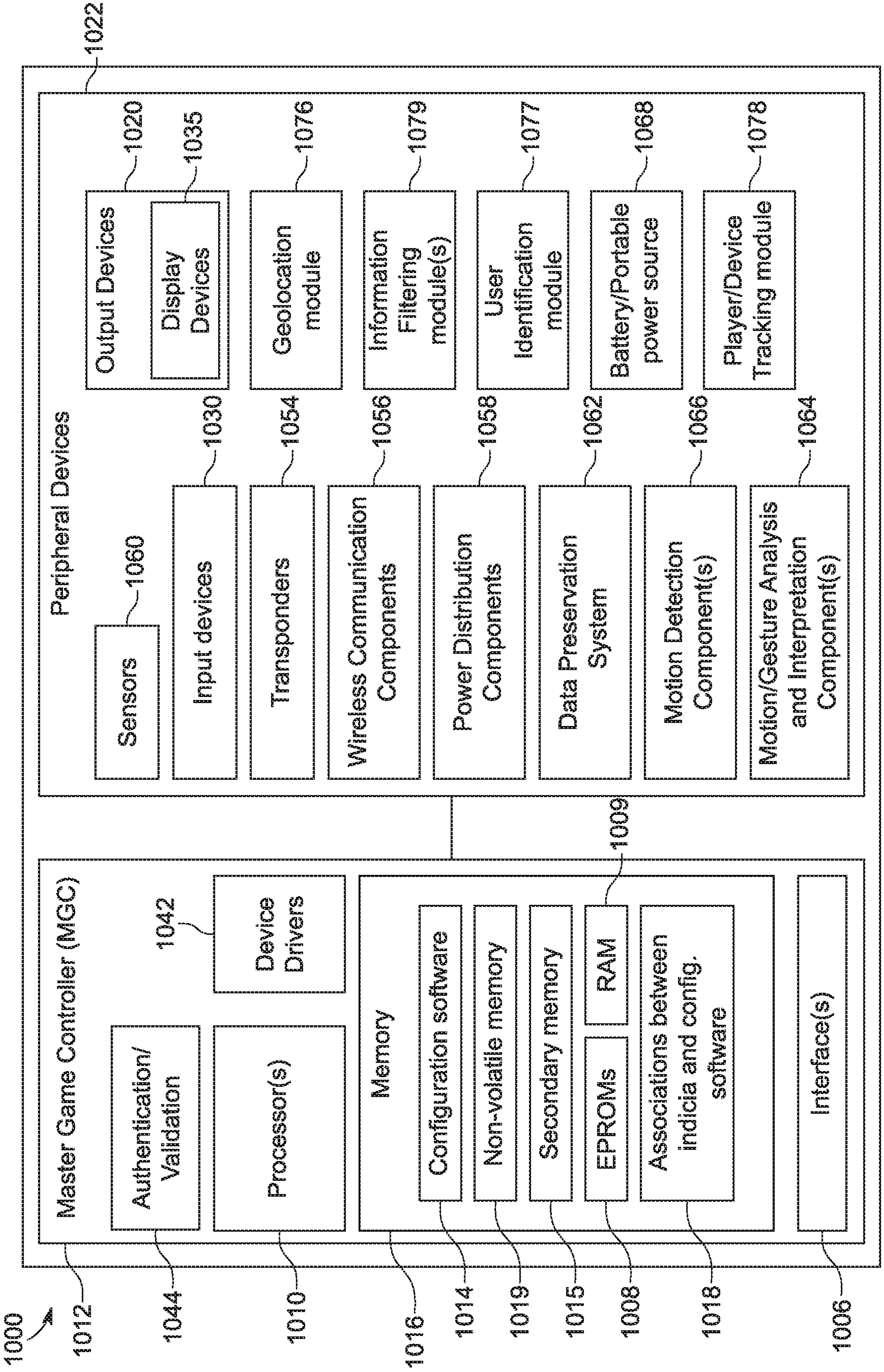
FIG. 3 is a schematic block diagram of one embodiment of an electronic configuration of an example electronic gaming machine of the present disclosure.
Figure 4A:
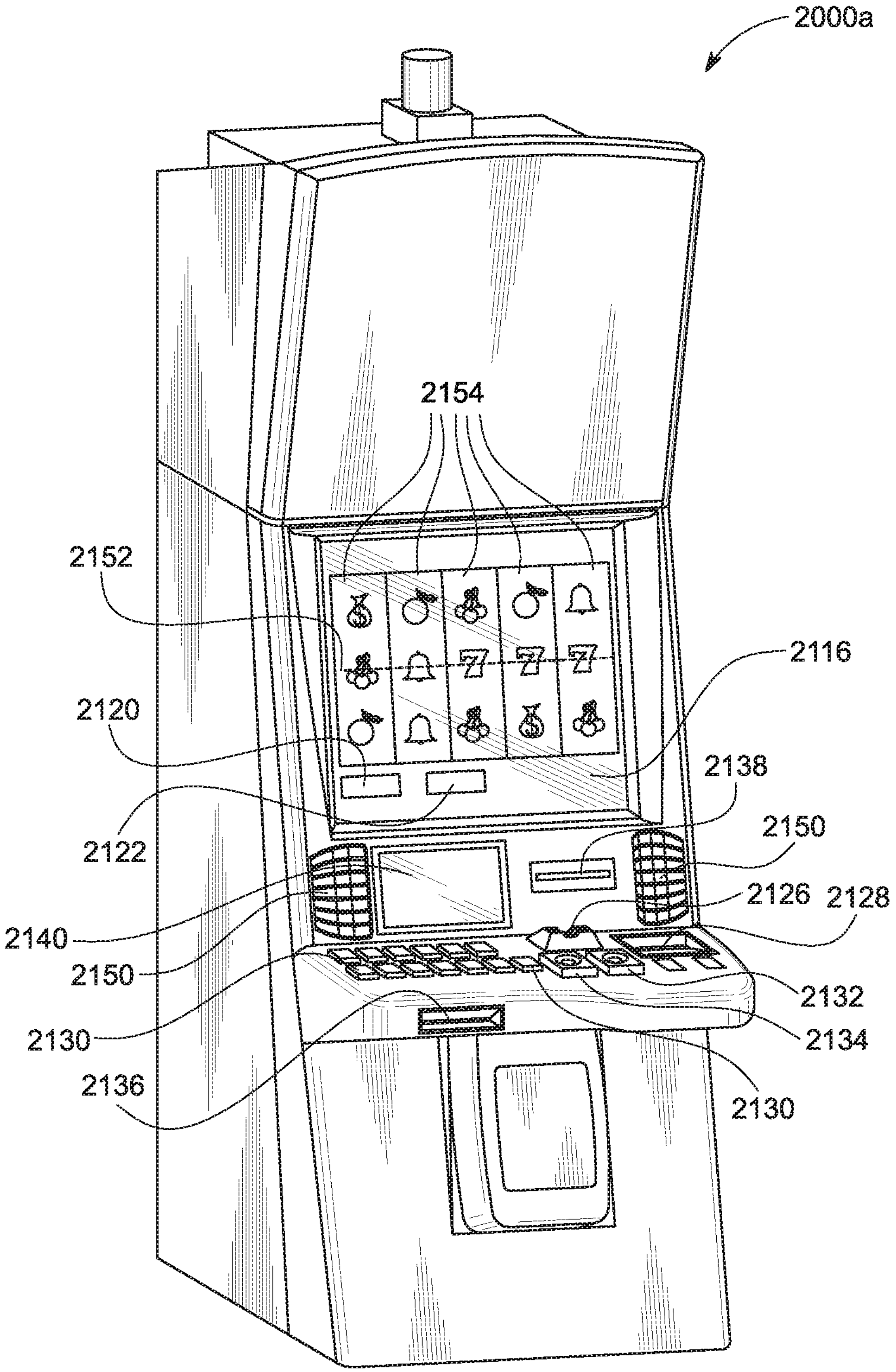
FIGS. 4A and 4B are perspective views of example alternative embodiments of an electronic gaming machine of the present disclosure.
Figure 4B:
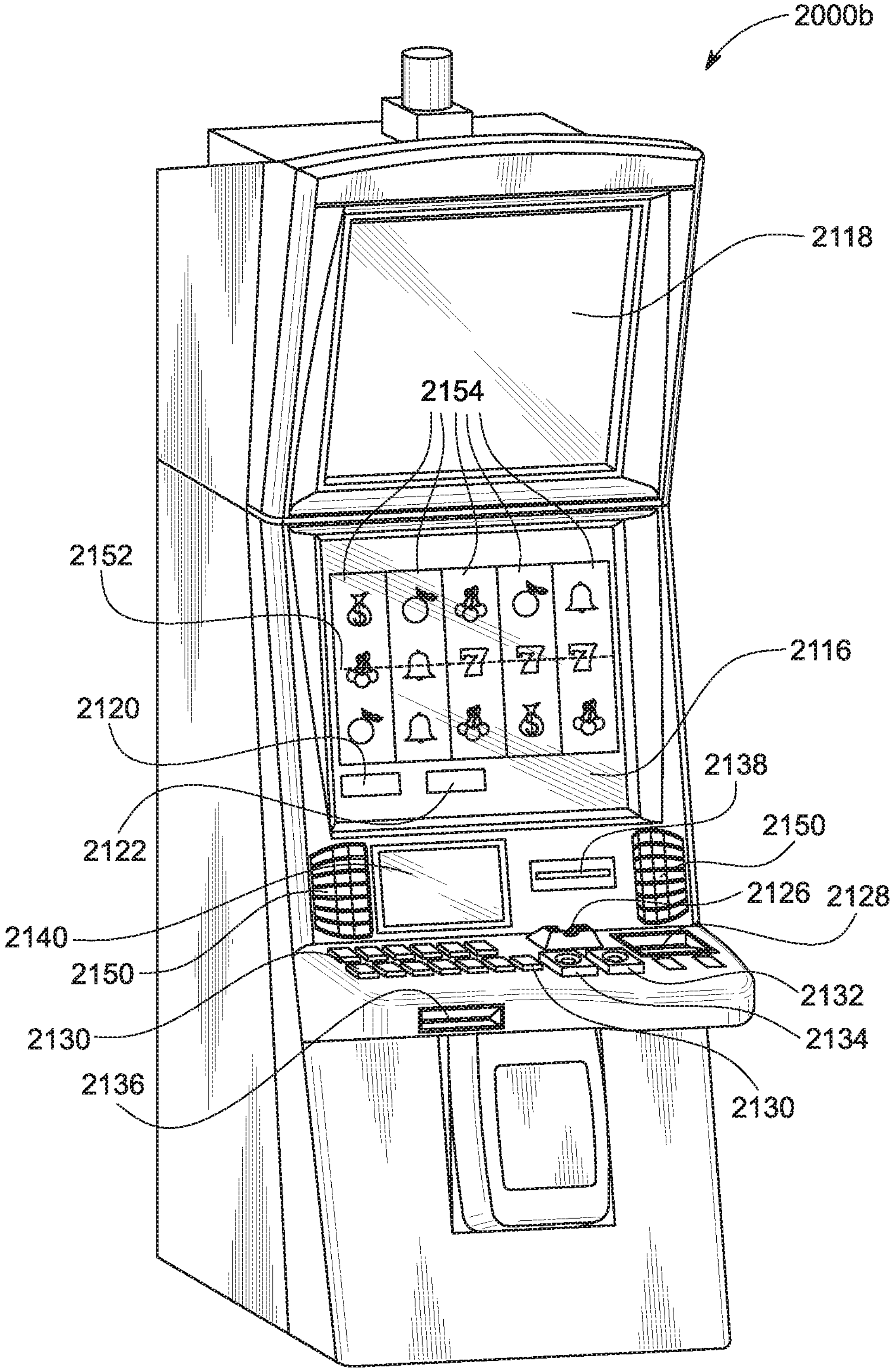
Figure 4C:
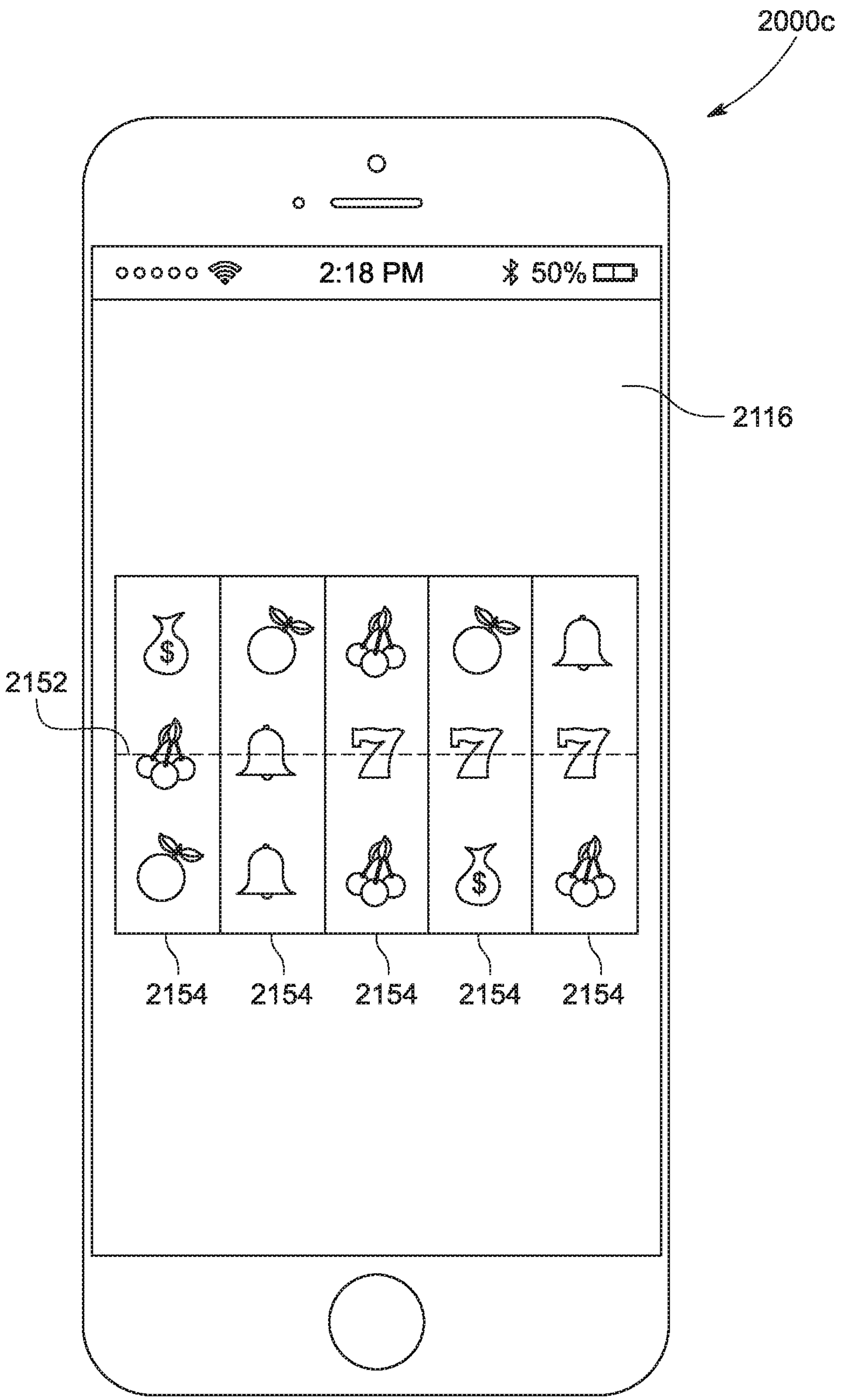
FIG. 4C is a front view of an example personal gaming device of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touchscreen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 4A and 4B each include a ticket printer and dispenser 2136**.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touchscreen coupled to a touch-screen controller or other touch-sensitive display overlay to enable interaction with any images displayed on a display device (as described below). One such input device is a conventional touch-screen button panel. The touchscreen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) can include any suitable games and/or wagering games, such as, but not limited to electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, which is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game, or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness, and, in many cases, EGMs are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general-purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general-purpose computing device industry, such as device compatibility and connectivity issues, might not be adequate in the gaming industry. For instance, a fault or a weakness tolerated in a general-purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general-purpose computing devices is that EGMs are state-based systems. A state-based system stores and maintains its current state in a non-volatile memory such that, in the event of a power failure or other malfunction, the state-based system can return to that state when the power is restored, or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general-purpose computing device.

A second difference between EGMs and general-purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general-purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general-purpose computing devices is that EGMs have unique peripheral device requirements that differ from those of a general-purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general-purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume, and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third-party verification device. Once the trusted memory device is verified as authentic and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general-purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a," "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The claims are as follows:

1. A gaming system comprising:

a processor; and a memory device that stores a plurality of instructions that, when executed by the processor, cause the processor to:

cause a display, by a display device, of a plurality of symbol displays;

cause a display, by the display device, of a plurality of aligned sets, each aligned set comprising a primary award indicator and a quantity of blocking elements, the quantity being at least one;

cause a display, by the display device, of a set selector, the set selector comprising, for each of the aligned sets, an aligned set indicator for that aligned set; and cause a display, by the display device, of a plurality of set selector triggering events associated with a plurality of activations of the symbol displays, and which comprises after each of the plurality of set selector triggering events:

a display, by the display device, of an activation of the set selector and indication by the set selector of one of the aligned sets by one of the aligned set indicators; and a display, by the display device, of one of:

an indication of no removal of any blocking elements for the indicated aligned set, an indication of a removal of a quantity of blocking elements for the indicated aligned set, and an indication of a removal of a quantity of blocking elements for the indicated aligned set, a release of the indicated aligned set, and a change to the changeable set selector comprising removing any of the aligned set indicators for the indicated aligned set from the set selector.

2. The gaming system of claim 1, wherein the plurality of instructions, when executed by the processor, cause the processor to cause a display, by the display device, of the plurality of aligned sets in one of: an upright top to bottom order, an upright bottom to top order, a highest primary award amount to a lowest primary award amount order, a lowest primary award amount to a highest primary award amount order.

3. The gaming system of claim 1, wherein the plurality of instructions, when executed by the processor, cause the processor to cause a display, by the display device, of the plurality of aligned sets initially at different levels.

4. The gaming system of claim 1, wherein the plurality of instructions, when executed by the processor, cause the processor to cause a display, by the display device, of the plurality of aligned sets initially at a same level.

5. The gaming system of claim 1, wherein the plurality of instructions, when executed by the processor, cause the processor to cause a display, by the display device, of a display, of the change to the changeable set selector comprises adding one of the aligned set indicators, for one the aligned sets not released, to the set selector.

6. The gaming system of claim 1, wherein the plurality of instructions, when executed by the processor, cause the processor to cause a display, by the display device, of a display, of the change to the changeable set selector comprises adding a plurality of aligned set indicators, for one the aligned sets not released, to the set selector.

7. The gaming system of claim 1, wherein the plurality of instructions, when executed by the processor, cause the processor to cause a display, by the display device, of a display, of the change to the changeable set selector comprises adding a plurality of different aligned set indicators, for a plurality of different ones of the aligned sets not released, to the set selector.

8. The gaming system of claim 1, wherein the plurality of instructions, when executed by the processor, cause the processor to cause a display, by the display device, of a display, of the change to the changeable set selector comprises adding an aligned set indicator, for a plurality of different ones of the aligned sets not released, to the set selector.

9. The gaming system of claim 1, wherein the plurality of instructions, when executed by the processor, cause the processor to cause a display, by the display device, of a display, of the change to the changeable set selector comprises adding an aligned set indicator, for all of the aligned sets not released, to the set selector.

10. The gaming system of claim 1, wherein the blocking elements are perceived persistence blocking elements.

11. The gaming system of claim 1, wherein the blocking elements are actual persistence blocking elements.

12. A gaming system comprising:
- a processor; and
- a memory device that stores a plurality of instructions that, when executed by the processor, cause the processor to:
  - cause a display, by the display device, of a plurality of aligned sets, each aligned set comprising a primary award indicator, a first quantity of secondary award indicators, and a second quantity of blocking elements, the first quantity being at least one, the second quantity being at least one;
  - cause a display, by the display device, of a set selector, the set selector comprising, for each of the aligned sets, an aligned set indicator for that aligned set; and
  - cause a display, by the display device, of a plurality of set selector triggering events associated with a plurality of activations of the symbol displays, and which comprises after each of the plurality of set selector triggering events:
    - a display, by the display device, of an activation of the set selector and indication by the set selector of one of the aligned sets by one of the aligned set indicators; and
    - a display, by the display device, of one of:
      - an indication of no removal of any blocking elements for the indicated aligned set and of an indication of a provision of one or more of the secondary award indicators,
      - an indication of a removal of a quantity of blocking elements for the indicated aligned set, and
      - an indication of a removal of a quantity of blocking elements for the indicated aligned set, a release of the indicated aligned set, and a change to the changeable set selector comprising removing any of the aligned set indicators for the aligned set from the set selector.

13. The gaming system of claim 12, wherein the plurality of instructions, when executed by the processor, cause the processor to cause a display, by the display device, of a display, of the change to the changeable set selector comprises adding one of the aligned set indicators, for one the aligned sets not released, to the set selector.

14. The gaming system of claim 12, wherein the plurality of instructions, when executed by the processor, cause the processor to cause a display, by the display device, of a display, of the change to the changeable set selector comprises adding a plurality of different aligned set indicators, for a plurality of different ones of the aligned sets not released, to the set selector.

15. The gaming system of claim 12, wherein the plurality of instructions, when executed by the processor, cause the processor to cause a display, by the display device, of a display, of the change to the changeable set selector comprises adding an aligned set indicator, for a plurality of different ones of the aligned sets not released, to the set selector.

16. A gaming system comprising:
- a processor; and
- a memory device that stores a plurality of instructions that, when executed by the processor, cause the processor to:
  - cause a display, by a display device, of a plurality of aligned sets, each aligned set comprising a primary award indicator, a first quantity of blocking elements, the first quantity being at least one;
  - cause a display, by the display device, of a second quantity secondary award indicators, the second quantity being at least one;
  - cause a display, by the display device, of a set selector, the set selector comprising, for each of the aligned sets, an aligned set indicator for that aligned set; and
  - cause a display, by the display device, of a plurality of set selector triggering events associated with a plurality of activations of the symbol displays, and which comprises after each of the plurality of set selector triggering events:
    - a display, by the display device, of an activation of the set selector and indication by the set selector of one of the aligned sets by one of the aligned set indicators; and
    - a display, by the display device, of one of:
      - an indication of no removal of any blocking elements for the indicated aligned set,
      - an indication of a removal of a quantity of blocking elements for the indicated aligned set and of an indication of a provision of one or more of the secondary award indicators, and
      - an indication of a removal of a quantity of blocking elements for the indicated aligned set, a release of the indicated aligned set, and a change to the changeable set selector comprising removing any of the aligned set indicators for the aligned set from the set selector.

17. The gaming system of claim 16, wherein the plurality of instructions, when executed by the processor, cause the processor to cause a display, by the display device, of a display, of the change to the changeable set selector comprises adding one of the aligned set indicators, for one the aligned sets not released, to the set selector.

18. The gaming system of claim 16, wherein the plurality of instructions, when executed by the processor, cause the processor to cause a display, by the display device, of a display, of the change to the changeable set selector comprises adding a plurality of different aligned set indicators, for a plurality of different ones of the aligned sets not released, to the set selector.

19. The gaming system of claim 16, wherein the plurality of instructions, when executed by the processor, cause the processor to cause a display, by the display device, of a display, of the change to the changeable set selector comprises adding an aligned set indicator, for a plurality of different ones of the aligned sets not released, to the set selector.

20. The gaming system of claim 16, wherein the plurality of instructions, when executed by the processor, cause the processor to cause a display, by the display device, of a display, of the change to the changeable set selector comprises adding an aligned set indicator, for all of the aligned sets not released, to the set selector.

* * * * *